US008811817B2

(12) United States Patent
Sakauchi et al.

(10) Patent No.: US 8,811,817 B2
(45) Date of Patent: Aug. 19, 2014

(54) OPTICAL SIGNAL TRANSMISSION DEVICE, OPTICAL SIGNAL RECEPTION DEVICE, WAVELENGTH DIVISION MULTIPLEXING OPTICAL COMMUNICATION DEVICE, AND WAVELENGTH PATH SYSTEM

(75) Inventors: Masahiro Sakauchi, Tokyo (JP); Shigeru Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 142 days.

(21) Appl. No.: 13/499,904

(22) PCT Filed: Aug. 4, 2010

(86) PCT No.: PCT/JP2010/063201
§ 371 (c)(1),
(2), (4) Date: Apr. 2, 2012

(87) PCT Pub. No.: WO2011/043122
PCT Pub. Date: Apr. 14, 2011

(65) Prior Publication Data
US 2012/0195594 A1 Aug. 2, 2012

(30) Foreign Application Priority Data
Oct. 7, 2009 (JP) .................................. 2009-233510

(51) Int. Cl.
H04J 14/00 (2006.01)
(52) U.S. Cl.
USPC ................... 398/45; 398/48; 398/49; 398/50; 398/51; 398/56; 398/68
(58) Field of Classification Search
USPC ............................. 398/45, 48–51, 56, 58, 68
See application file for complete search history.

(56) References Cited

U.S. PATENT DOCUMENTS 6,594,049 B1 * 7/2003 Brinkman et al. .............. 398/49
7,298,540 B2 * 11/2007 Peng et al. .................... 359/256

(Continued)

FOREIGN PATENT DOCUMENTS

JP 11-068656 A 3/1999
JP 11-068656 * 9/1999

(Continued)

OTHER PUBLICATIONS

International Search Report in PCT/JP2010/063201 dated Oct. 19, 2010(English Translation Thereof).

Primary Examiner — Pranesh Barua
(74) Attorney, Agent, or Firm — McGinn IP Law Group, PLLC

(57) ABSTRACT

Restrictions, due to wavelength paths which are non-alternative combinations of wavelengths and paths, are solved. An optical-signal-transmission device comprises M optical-output means outputting optical signals having different wavelengths; optical-switch means having M input ports respectively connected to the optical-output means and output ports, and switching connections between the input ports and the output ports; and wavelength-multiplexing means having M acceptance ports respectively connected to the output ports, N forward ports switchably connected to the acceptance ports corresponding to wavelengths of optical signals inputted to the acceptance ports and transmitting multiplexed-optical signals corresponding to the optical signals accepted by the acceptance ports, wherein when Y particular input ports of the input ports are connected to one particular output port of the output ports, the switch means combines Y optical signals inputted to the particular input ports to generate a combined signal, and outputs the combined signal to the particular output port.

19 Claims, 17 Drawing Sheets

(56) References Cited

U.S. PATENT DOCUMENTS

| | | | |
|---|---|---|---|
| 7,394,983 B2* | 7/2008 | Lee et al. | 398/45 |
| 7,792,398 B2* | 9/2010 | Tanaka et al. | 385/16 |
| 2001/0051017 A1 | 12/2001 | Okuno | |
| 2002/0118913 A1 | 8/2002 | Maeda et al. | |
| 2002/0163693 A1* | 11/2002 | Rubissa et al. | 359/128 |
| 2006/0034610 A1* | 2/2006 | Akiyama et al. | 398/83 |
| 2008/0247753 A1* | 10/2008 | Demir et al. | 398/48 |
| 2010/0215366 A1 | 8/2010 | Sato et al. | |

FOREIGN PATENT DOCUMENTS

| | | |
|---|---|---|
| JP | 2000-004460 A | 1/2000 |
| JP | WO01/91340 A1 | 11/2001 |
| JP | 2002-262317 A | 9/2002 |
| JP | 2004-117449 A | 4/2004 |
| JP | WO2009/022478 A1 | 2/2009 |

* cited by examiner

Fig.2B
|  | λ1 | λ2 | λ3 | λ4 |
|---|---|---|---|---|
| P1 | #1 | #2 | #3 | #4 |
| P2 | #4 | #1 | #2 | #3 |
| P3 | #3 | #4 | #1 | #2 |
| P4 | #2 | #3 | #4 | #1 |
Fig.2D
|  | λ1 | λ2 | λ3 | λ4 | λ5 | λ6 | λ7 | λ8 |
|---|---|---|---|---|---|---|---|---|
| P1 | #1 | #2 | #3 | #4 | #5 | #6 | #7 | #8 |
| P2 | #8 | #1 | #2 | #3 | #4 | #5 | #6 | #7 |
| P3 | #7 | #8 | #1 | #2 | #3 | #4 | #5 | #6 |
| P4 | #6 | #7 | #8 | #1 | #2 | #3 | #4 | #5 |
| P5 | #5 | #6 | #7 | #8 | #1 | #2 | #3 | #4 |
| P6 | #4 | #5 | #6 | #7 | #8 | #1 | #2 | #3 |
| P7 | #3 | #4 | #5 | #6 | #7 | #8 | #1 | #2 |
| P8 | #2 | #3 | #4 | #5 | #6 | #7 | #8 | #1 |
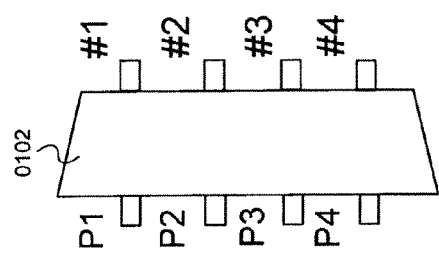
Fig.2A
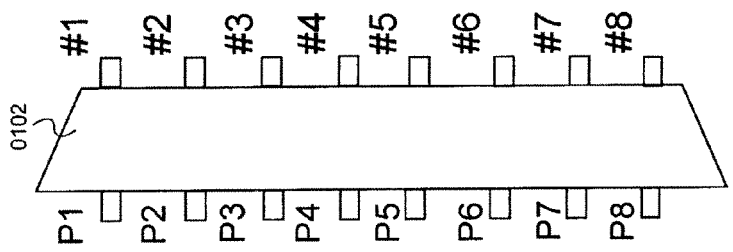
Fig.2C Cross state Bar state operation of a setting timing of
optical signal combining operation operation of a non-setting timing (Cross)
of optical signal combining operation operation of a setting timing of
optical signal splitting operation operation of a non-setting timing (Cross) of
optical signal splitting operation

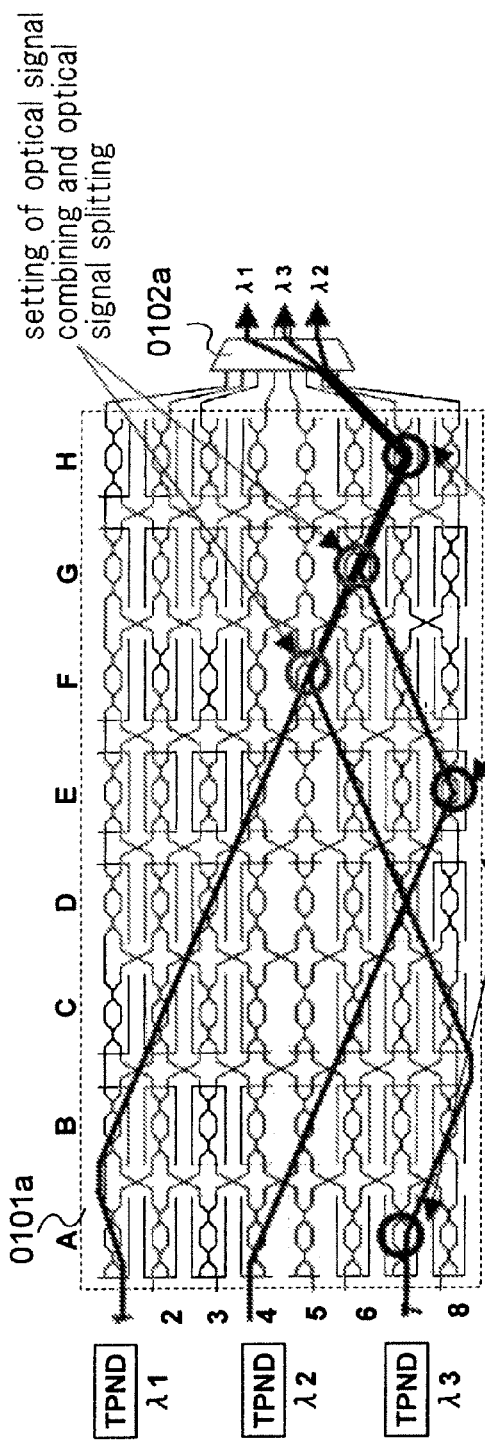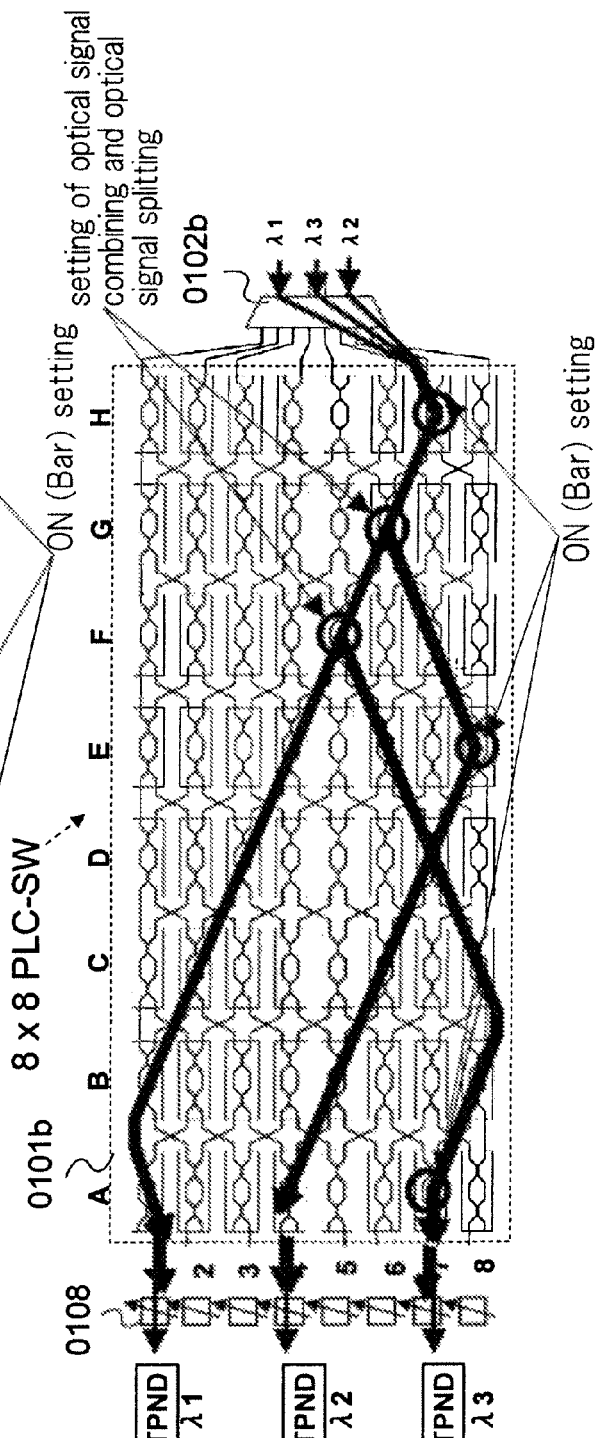
Fig. 11A
Fig. 11B

OPTICAL SIGNAL TRANSMISSION DEVICE, OPTICAL SIGNAL RECEPTION DEVICE, WAVELENGTH DIVISION MULTIPLEXING OPTICAL COMMUNICATION DEVICE, AND WAVELENGTH PATH SYSTEM

TECHNICAL FIELD

The present invention relates to an optical communication network based on wavelength division multiplexing, in particular, to an optical signal transmission device, an optical signal reception device, a wavelength division multiplexing optical communication device, and wavelength path system.

BACKGROUND ART

The WDM (wavelength division multiplexing) system has been introduced for optical communication networks. For example, the WDM has been introduced so as to accommodate many wavelength paths that are used for point-to-point communication in the core network and then the WDM for metro and regional networks and the ROADM (Reconfigurable Optical Add Drop Multiplexer) have been widely applied.

As wavelength paths increase, many optical signals are multiplexed so that more services can be realized. As a result, a fault that occurs in the photonic physical layer enormously affects a plurality of upper level service layers. In addition, with the widespread introduction of use of the ROADM, strong demand has arisen for nodes in the wavelength path network having advanced functions, high reliability and reduced cost.

Patent Literature 1 presents techniques that improve the reliability of a wavelength path network.

FIG. 1 of Patent Literature 1 shows the basic configuration of a wavelength path division multiplexing optical transmission device (hereinafter simply referred to as "transmission device") and an example of switching performed therein upon occurrence of a fault. FIG. 1 (b) of Patent Literature 1 shows a switching operation corresponding to a fault that occurs in optical transmitter 12-1; and FIG. 1 (c) of Patent Literature 1 shows a switching operation corresponding to a fault that occurs in transmission line 52-1.

First, the action of optical transmission device 12-1 performed when a fault occurs will be described.

Signal selection circuit 11 switches the signal output destination from optical transmitter 12-1 to optical transmitter 13-1 such that optical transmitter 13-1 provided as a secondary system operates as a primary system. Thereafter, wavelength multiplexing means 14 multiplexes wavelengths of optical signals transmitted from optical transmitters 12-2 to 12-m and 13-1 so as to generate a wavelength multiplexed optical signal and transmits the wavelength multiplexed optical signal to transmission line 52-1.

On the reception side, wavelength demultiplexing means 21 demultiplexes the wavelength multiplexed optical signal transmitted from transmission line 52-1 into optical signals of individual wavelengths and sends the optical signals of individual wavelengths to optical receivers 22-2 to 23-1, respectively. When individual optical receivers 22-2 to 23-1 accept the optical signals of individual wavelengths, they output the accepted optical signals to signal selection circuit 24. Signal selection circuit 24 switches the signal output destinations such that the signals received from optical receiver 23-1 are substituted for signals received from optical receiver 22-1.

Thus, communication that was performing before a fault occurred can be restored while the switching operation is being performed and after the communication is blocked.

Next, the operation of optical transmission device 12-1 performed when a fault occurs over transmission line 52-1 will be described.

Wavelength multiplexing means 14 multiplexes wavelengths of optical signals transmitted from optical transmitters 12-1 to 12-m so as to generate a wavelength multiplexed optical signal and then switches the output designation of the wavelength multiplexed optical signal from transmission line 52-1 to transmission line 52-2 that is the secondary system.

On the reception side, wavelength demultiplexing means 21 that has the same wavelength input and output characteristics as does wavelength multiplexing means 14 demultiplexes the wavelength multiplexed optical signal into optical signals at individual wavelengths and sends the optical signals at individual wavelengths to optical receivers 22-1 to 22-m, respectively.

Thus, the communication that was being carried out before a fault occurred can be restored while the switching operation is being performed and after the communication is blocked.

Although FIG. 1 of Patent Literature 1 shows the case in which there are two transmission lines that are the primary system and secondary system, a plurality of primary transmission lines may be used. Alternatively, as shown in FIG. 9 of Patent Literature 1, the network can be extended using optical add drop nodes.

FIG. 1A is a schematic diagram showing a transmission device presented in Patent Literature 1.

In FIG. 1A, signal selection circuits (optical matrix switches) 1501 and 1504 are disposed respectively between optical transmitter 1505 and wavelength multiplexing section 1502 and between wavelength demultiplexing section 1503 and optical receiver 1510 as shown in FIG. 3 (b), FIG. 5 (c), and FIG. 8 (c) of Patent Literature 1. The transmission side and the reception side are connected through three or more transmission lines (or networks) 1506 to 1509.

Optical signals of wavelengths λ1 to λ4 transmitted from optical transmitter 1505 are input to input and output ports P1 to P4 through optical matrix switch 1501, respectively.

Wavelength multiplexing section 1502 multiplexes the wavelengths of each optical signal having wavelengths λ1 to λ4, generates a wavelength multiplexed optical signal, and then outputs the wavelength multiplexed optical signal from path port #1. Thereafter, the wavelength multiplexed optical signal is input to path port #1 of wavelength demultiplexing section 1503 through transmission line 1506.

Wavelength demultiplexing section 1503 demultiplexes the wavelength multiplexed optical signal into optical signals of individual wavelengths, generates each of optical signals having wavelengths λ1 to λ4, and then outputs each of the optical signals having wavelengths λ1 to λ4 from input and output ports P1 to P4, respectively.

The individual optical signals having wavelengths λ1 to λ4 transmitted from wavelength demultiplexing section 1503 are received by optical receiver 1510 through optical matrix switch 1504.

RELATED ART LITERATURE

Patent Literature

Patent Literature 1: JP11-068656A, Publication

SUMMARY OF THE INVENTION

Problem to be Solved by the Invention

Transmission devices need to simultaneously switch the primary transmission line to the secondary transmission line when a fault occurs over the primary transmission line or not only perform the switching operation for a fault that occurs in an optical transmitter or an optical receiver, but also transmit optical signals of any wavelength to any transmission lines.

The transmission device presented in Patent Literature 1, however, has a problem in which combinations of wavelengths and paths that are not selectable occur.

The reason why such a problem occurs will be described in the following.

First, input and output characteristics of wavelength multiplexing section 1502 and wavelength demultiplexing section 1503 and those of optical matrix switches 1501 and 1504 will be described. The wavelength multiplexing section has the same configuration as does the wavelength demultiplexing section.

FIGS. 2A and 2B are schematic diagrams showing the relationship of the connections of input and output ports P1 to P4 and path ports #1 to #4 of the wavelength multiplexing section and wavelength demultiplexing section. FIGS. 2C and 2D show the relationship between the connections of input and output ports P1 to P8 and path ports #1 to #8 of the wavelength multiplexing section and the wavelength demultiplexing section.

As shown in FIG. 2A and FIG. 2B, the relationship between the connections of input and output ports P1 to P4 and path ports #1 to #4 has a wavelength dependency. Thus, when an optical signal having wavelength λ1 is input to input and output port P1, the optical signal having wavelength λ1 is output from path port #1; when an optical signal having wavelength λ2 is input to input and output port P1, the optical signal having wavelength λ2 is output from path port #2.

FIG. 3A is a schematic diagram showing 4×4 optical matrix switch 1501 shown in FIG. 1A. Optical matrix switch 1504 shown in FIG. 1A has the same configuration as does optical matrix switch 1501.

In optical matrix switch 1501, optical switch elements 1701 each have first and second input sections and first and second output sections and are arranged in the same orientation and in a matrix shape. FIGS. 3B and 3C are schematic diagrams showing optical switch element 1701.

Optical switch element 1701 can be selectively set for a cross state in which an optical signal accepted by the first input section is output from the first output section and an optical signal accepted by the second input section is output from the second output section or a bar state in which an optical signal accepted by the first input section is output from the second output section and an optical signal accepted by the second input section is output from the first output section.

Optical matrix switch 1501 has a non-blocking configuration in which any port of one port group (an input and output port group arranged in the vertical direction of FIG. 3A) can be connected to any port in the other port group (an input and output port group arranged in the horizontal direction of FIG. 3A). In addition, optical matrix switch 1501 outputs each optical signal without combining it with another optical signal.

Next, combinations of wavelengths and paths that are not selectable will be described.

In the transmission device shown in FIG. 1A, when an optical signal having wavelength λ2 that is being transmitted is switched from path port #1 to path port #2, the connections in optical matrix switch 1501 need to be switched such that an optical signal having wavelength λ2 is input to input and output port P1 of the wavelength multiplexing section corresponding to the relationship between input and output ports and paths of the wavelength multiplexing section shown in FIG. 2B.

However, since input and output port P1 has been used for a path (optical path) through which the optical signal having wavelength λ1 is output to path port #1, it is impossible for optical matrix switch 1501 to input the optical signal having wavelength λ2 to input and output port P1 of the wavelength multiplexing section.

Thus, the configuration of an optical matrix switch that applies one wavelength for each input and output port of the wavelength path multiplexing section and wavelength path demultiplexing section results in combinations of wavelengths and paths that are not selectable.

An object of the present invention is to provide an optical signal transmission device, an optical signal reception device, a wavelength division multiplexing optical communication device, and a wavelength path system that can solve the foregoing problem.

Means that Solve the Problem

An optical signal transmission device according to the present invention, comprises:

M (where M is an integer equal to or greater than 2) optical output means that outputs optical signals having different wavelengths;

optical switch means that has M input ports respectively connected to said M optical output means, M output ports, and switch means that switches connections of said input ports and said output ports; and wavelength multiplexing means that has M acceptance ports respectively connected to said M output ports, N (where N is an integer equal to or greater than 2 and equal to or smaller than M) forward ports switchably connected to said acceptance ports corresponding to wavelengths of optical signals that are input to said acceptance ports and that transmits multiplexed optical signals corresponding to the optical signals accepted by said acceptance ports from said forward ports, when said switch means performs a combining connection in which Y (where Y is an integer equal to or greater than 2 and equal to or smaller than M) particular input ports from among said M input ports are connected to one particular output port from among said M output ports, said switch means combines Y optical signals that are input to said Y particular input ports, generates a combined signal, and outputs the combined signal to said particular output port.

An optical signal reception device according to the present invention, comprises:

wavelength demultiplexing means that has N (where N is an integer equal to or greater than 2) acceptance ports that accept wavelength multiplexed optical signals and M (where M is an integer equal to or greater than N) acceptance ports that are switchably connected to said acceptance ports corresponding to wavelengths of the wavelength multiplexed optical signals that are input to said acceptance ports;

optical switch means that has M input ports respectively connected to said M forward ports, M output ports, and switch means that switches connections of said input ports and said output ports;

M wavelength selection means that are respectively connected to said M output ports and that are capable of selecting transmission wavelengths; and M optical acceptance means that are respectively connected to said M wavelength selection means and that receive optical signals that have been transmitted through said wavelength selection means connected to the own wavelength selection means, wherein when said switch means performs a splitting connection in which one particular input port of said M input ports is connected to Y (where Y is equal to or greater than) 2 and equal to or smaller than M), said switch means splits an optical signal that is input to said particular input port into Y split signals and outputs the Y split signals to said Y particular output ports.

Effect of the Invention

According to the present invention, combinations of wavelengths and paths that are not selectable can be prevented from occurring.

BRIEF DESCRIPTION OF DRAWINGS

FIG. 2A is a schematic diagram showing an example of the configuration of ports of a wavelength path division multiplexing circuit.
FIG. 2B is a schematic diagram showing the relationship between wavelength combining ports and wavelength splitting ports of the wavelength path division multiplexing circuit shown in FIG. 2A.
FIG. 2C is a schematic diagram showing an example of the configuration of ports of the wavelength path division multiplexing circuit.
FIG. 2D is a schematic diagram showing the relationship between wavelength combining ports and wavelength splitting ports of the wavelength path division multiplexing circuit shown in FIG. 2C.

FIG. 11A is a schematic diagram describing combining and splitting operations on a wavelength path according to the second exemplary embodiment of the present invention.
FIG. 11B is a schematic diagram describing combining and splitting operations on a wavelength path according to the second exemplary embodiment of the present invention.

BEST MODES THAT CARRY OUT THE INVENTION

Next, with reference to the accompanying drawings, embodiments of the present invention will be described in detail.

First Exemplary Embodiment

Figure 4:
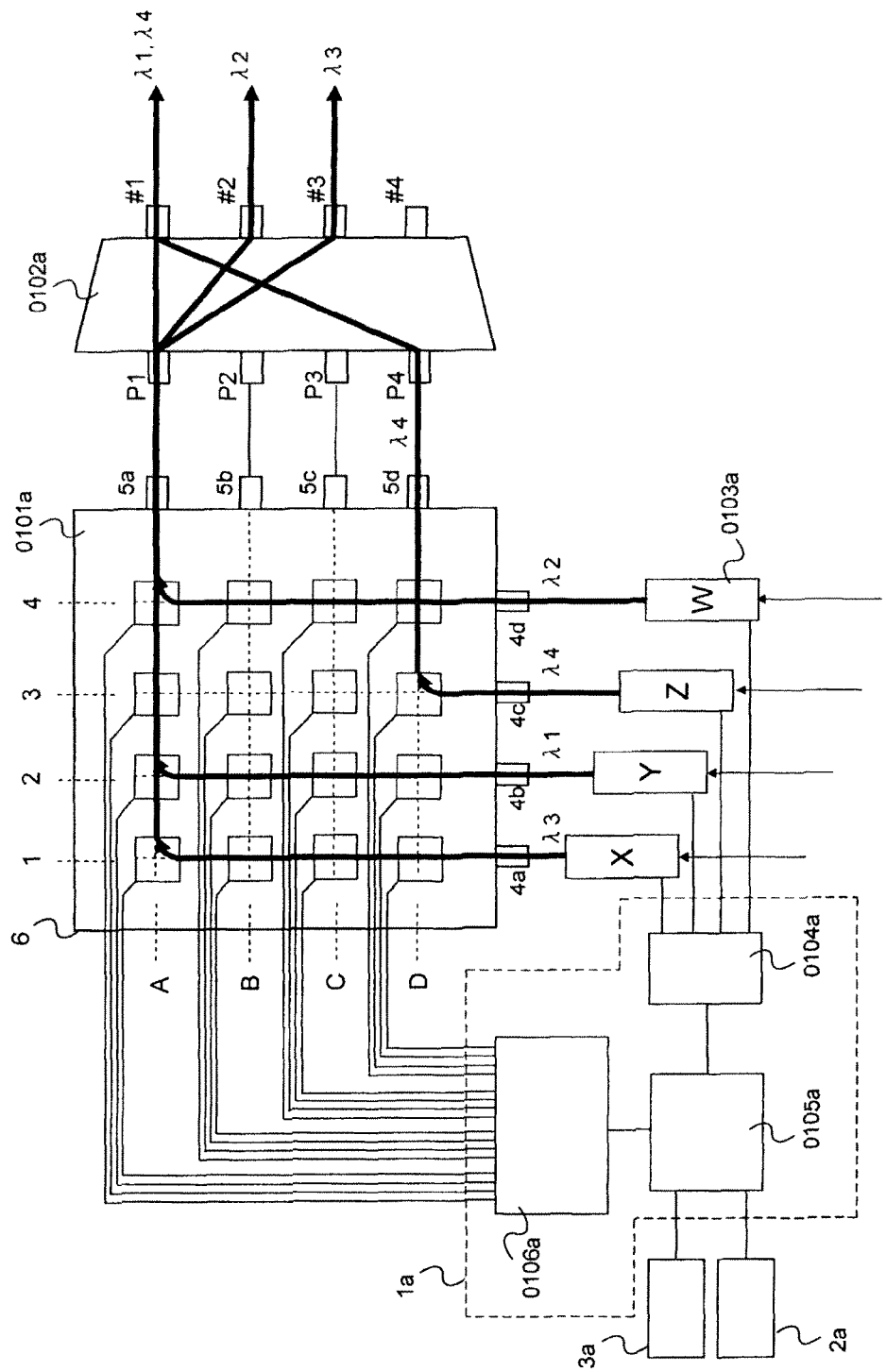
FIG. 4 is a block diagram showing a transmission side device according to a first exempla embodiment of the present invention.

FIG. 4 shows a transmission side device included in a wavelength path division multiplexing optical transmission device according to a first exemplary embodiment of the present invention.

In FIG. 4, the transmission side device (optical signal transmission device) includes optical matrix switch circuit 0101*a*, wavelength path division multiplexing circuit 0102*a*, optical output sections 0103*a*X to 0103*a*W, optical transmission wavelength control circuit 0104*a*, optical switch splitting and combining ratio control circuit 0106*a*, optical transmission device control circuit 0105*a*, storage section 2*a*, and save section 3*a*. Optical transmission wavelength control circuit 0104*a*, optical switch splitting and combining ratio control circuit 0106*a*, and optical transmission device control circuit 0105*a* are included in control section 1*a*.

Control section 1*a* can be generally referred to as control means. Storage section 2*a* can be generally referred to as storage means. Save section 3*a* can be generally referred to as save means. Optical matrix switch circuit 0101*a* can be generally referred to as optical switch means. Optical output sections 0103*a*X to 0103*a*W can be generally referred to as optical output means. Wavelength path division multiplexing circuit 0102*a* can be referred to as wavelength multiplexing means.

Figure 5A:
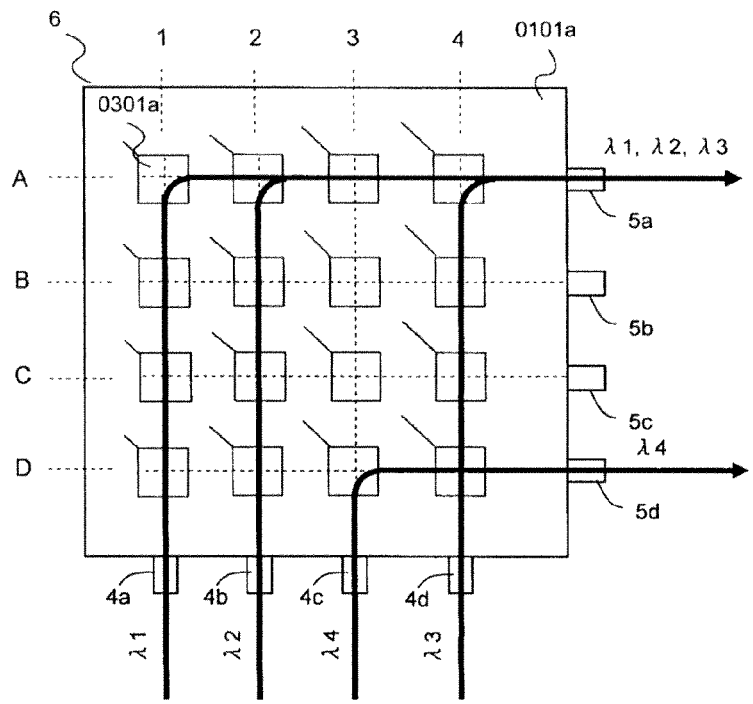
FIG. 5A is a schematic diagram describing a combining operation of an optical matrix switch circuit.

FIG. 5A is a schematic diagram showing the configuration of optical matrix switch circuit 0101*a*. Optical matrix switch circuit 0101*a* includes M input ports 4*a* to 4*d* respectively connected to M (where M=4) optical output sections 0103*a*X to 0103*a*W, M output ports 5*a* to 5*d*, and switch section 6 that can freely switch the connections of input ports 4*a* to 4*d* and output ports 5*a* to 5*d*. In this context, M is not limited to 4, but is an integer equal to or greater than 2.

Switch section 6 can be generally referred to as switch means. When switch section 6 performs a combining connection in which Y (where Y is an integer equal to or greater than 2 and equal to or smaller than M) particular input ports are connected to one particular output port of M output ports 5*a* to 5*d*, switch section 6 combines Y optical signals that are input to the Y particular input ports, generates a combined signal, and then outputs the combined signal to the particular output port. Switch section 6 combines the Y optical signals such that the powers of Y optical signals included in the combined signal become equal.

Switch section 6 is composed of a plurality of optical switch elements 0301*a* connected in a grid shape.

Figure 5B:
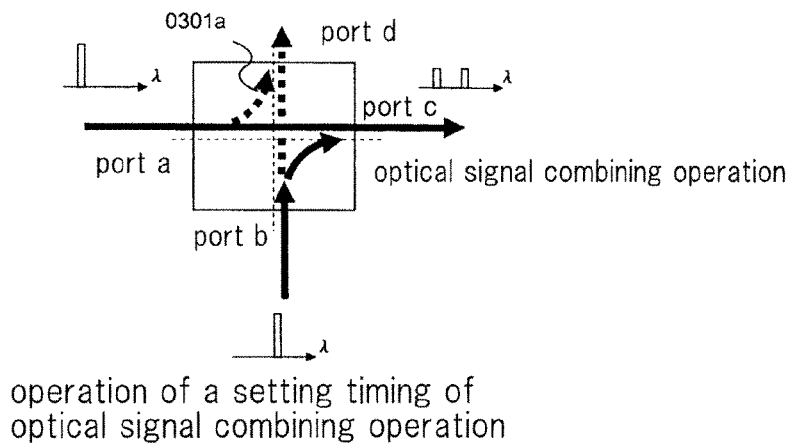
FIG. 5B is a schematic diagram describing the cobining operation of the optical matrix switch circuit.
Figure 5C:
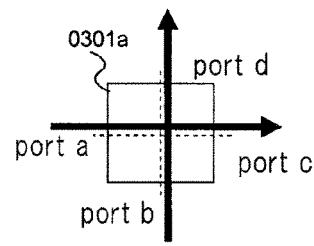
FIG. 5C is a schematic diagram describing the combining operation of the optical matrix switch circuit.

As shown in FIG. 5B and FIG. 5C, optical switch elements 0301*a* each have port a (second input section), port b (first input section), port c (second output section), and port d (first output section). Optical switch elements 0301*a* are arranged in the same orientation and in a matrix shape of M rows×M columns.

In optical matrix switch circuit 0101*a*, port b of optical switch element 0301*a* of M-th row (D-th row of FIG. 5A) is connected to input port 4 and port c of optical switch element 0301*a* of M-th column is connected to output port 5.

Optical switch elements 0301*a* can combine an optical signal that is input from port a and an optical signal that is input from port b by properly adjusting the splitting and combining ratios of optical switch elements 0301*a* as shown in FIG. 5B.

Optical switch elements 0301*a* can be selectively set for either a cross state, a bar state, or a combining state.

The cross state is a state in which an optical signal accepted by port b is output from port d and an optical signal accepted by port a is output from port c.

The bar state is a state in which an optical signal accepted by port b is output from port c and an optical signal accepted by port a is output from port d.

The combining state is a state in which an optical signal accepted by port b and an optical signal accepted by port a are combined and the combined optical signal is output from port c.

When the combining connection is performed, optical switch elements 0301*a* each become either the cross state, the bar state, or the combining state such that the combined signal is generated and then the combined signal is output from a particular output port.

In FIG. 4, M optical output sections 0103*a*X to 0103*a*W are transponders or optical transmitters. Optical output sections 0103*a*X to 0103*a*W can output optical signals having any WDM wavelengths by a wavelength varying function. Optical output sections 0103*a*X to 0103*a*W are respectively connected to input ports 4*a* to 4*d* of optical matrix switch circuit 0101*a* and they output optical signals having different wavelengths.

Wavelength path division multiplexing circuit 0102*a* has M wavelength splitting ports (also referred to as "acceptance ports") P1 to P4 respectively connected to output ports 5*a* to 5*d* of optical matrix switch circuit 0101*a* and N (where N=4) wavelength combining ports (also referred to as "forward ports") that just depend on the wavelengths of optical signals that are input to ports P1 to P4. It should be noted that N is not limited to 4, but is an integer equal to or greater than 2 and equal to or smaller than M.

Storage section 2*a* stores first connection information that represents the relationship of the connections of forward ports #1 to #4 and acceptance ports P1 to P4 that depend on wavelengths, second connection information that represents the relationship between the connections of acceptance ports P1 to P4 and output ports 5*a* to 5*d* of optical matrix switch circuit 0101*a*, and third connection information that represents the relationship between the connections of input ports 4*a* to 4*d* of optical matrix switch circuit 0101*a* and optical output sections 0103*a*X to 0103*a*W. The first connection information, the second connection information, and the third connection information are included in transmission side connection information (connection information).

When control section 1*a* accepts a setup request that represents a communication port that is any one of forward ports #1 to #4 and Y types of communication wavelengths, control section 1*a* specifies Y optical output sections of M optical output sections 0103*a*X to 0103*a*W as transmission side communication sections (communication means) that output optical signals having Y types of communication wavelengths.

Thereafter, control section 1*a* refers to the transmission side connection information stored in storage section 2*a* and specifies a particular input port connected to each transmission side communication section of M input ports 4*a* to 4*d*, a particular acceptance port connected to the communication port of M acceptance ports P1 to P4, a particular output port connected to the particular acceptance port of M output ports 5*a* to 5*d*, and a particular optical path in switch section 6, the optical path connecting the particular input port and the particular output port. Thereafter, control section 1*a* controls switch section 6 such that individual optical paths are configured.

For example, after control section 1*a* has specified the transmission side communication sections, control section 1*a* refers to the transmission side connection information stored in storage section 2*a*, specifies a particular optical path of optical matrix switch circuit 0101*a* that is part of optical paths from each transmission side communication section to a communication port, and sets each of optical switch devices 0301*a* for either the cross state, the bar state, or the combining state such that individual particular optical paths are configured.

Control section 1*a* sets particular optical switch elements that lie where particular optical paths merge of optical switch elements 0301*a* for the combining state.

Each of optical switch elements 0301*a* can combine an optical signal accepted by port b and an optical signal accepted by port a at any ratio in the combined state. Control section 1*a* sets particular optical switch elements for the combined state and sets the combined ratio of optical signals such that the powers of individual optical signals that have merged become equal.

In addition, control section 1*a* saves information that represents the communication ports, communication wavelengths, transmission side communication sections, particular optical paths, particular input ports, particular output ports, and particular acceptance ports that are arranged in switch section 6 to save section 3*a*.

When optical transmission device control circuit 0105*a* accepts a setup request that represents a paths and a wavelength (particular wavelength) from upper level setup means (not shown), optical transmission device control circuit 0105*a* refers to the first connection information, the second connection information, and the third connection information stored in storage section 2*a* and controls optical transmission wavelength control circuit 0104*a* and optical switch splitting and combining ratio control circuit 0106*a*.

Optical transmission wavelength control circuit 0104*a* sets the wavelength of an optical signal that optical output section 0103 outputs as specified by a request from optical transmission device control circuit 0105*a* for a transmission wavelength (particular wavelength) specified by the request.

Optical switch splitting and combining ratio control circuit 0106*a* sets optical switch devices 0301*a* for the splitting and combining ratios as specified by the request from optical transmission device control circuit 0105*a*.

Figure 6:
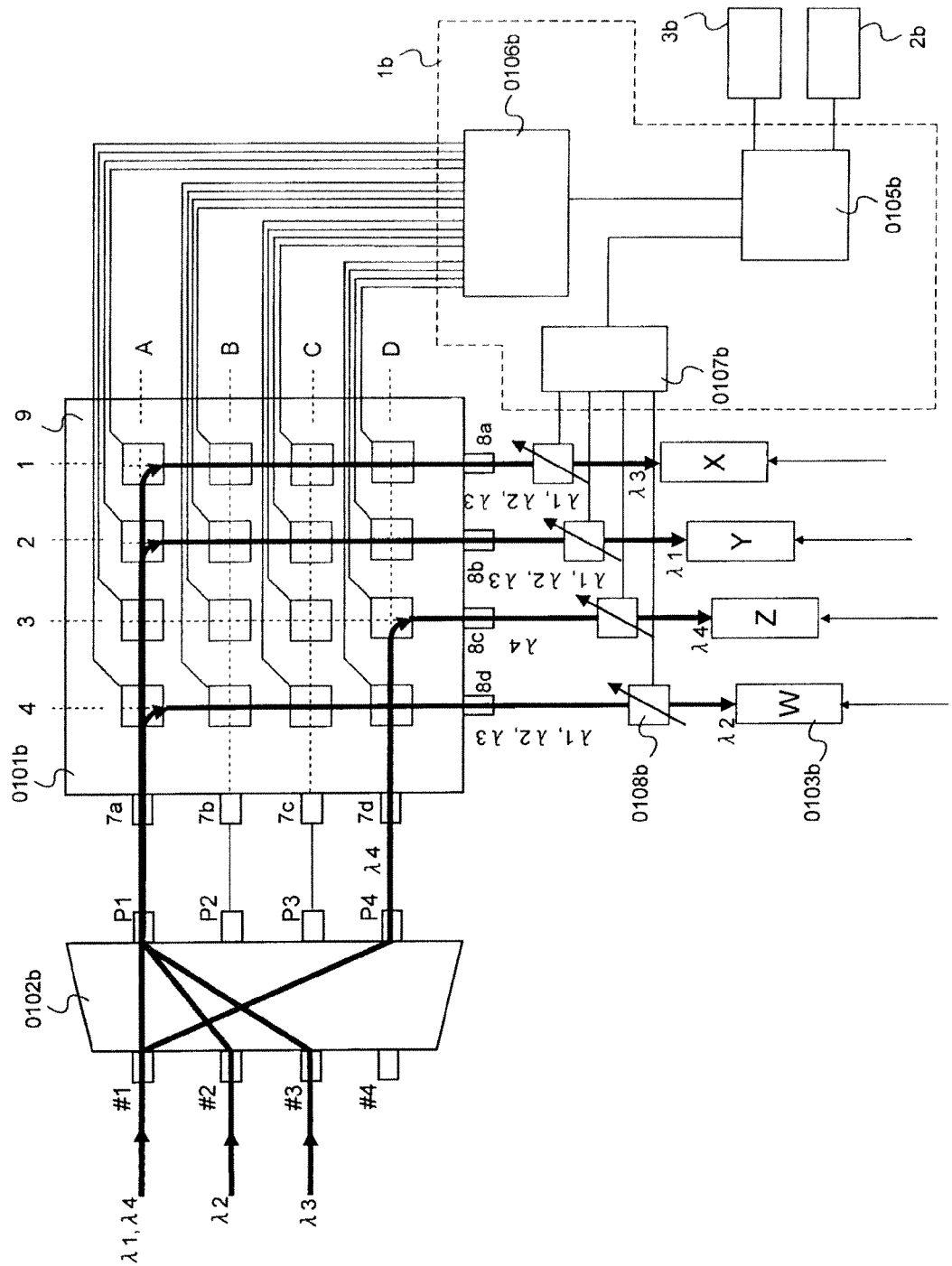
FIG. 6 is a block diagram showing a reception side device according to the first exemplary embodiment of the present invention.

FIG. 6 shows a reception side device of the wavelength path division multiplexing optical transmission device according to the first exemplary embodiment of the present invention.

In FIG. 6, the reception side device (optical signal reception device) includes optical matrix switch circuit 0101*b*, wavelength path division multiplexing circuit 0102*b*, optical acceptance sections 0103*b*X to 0103*b*W, optical switch splitting and combining ratio control circuit 0106*b*, optical transmission device control circuit 0105*b*, wavelength variable filters 0108*b*X to 0108*b*W, wavelength variable filter control circuit 0107*b*, storage section 2*b*, and save section 3*b*. Optical switch splitting and combining ratio control circuit 0106*b*, optical transmission device control circuit 0105*b*, and wavelength variable filter control circuit 0107*b* are included in control section 1*b*.

Control section 1*b* can be generally referred to as control means. Storage section 2*b* can be generally referred to as storage means. Save section 3*b* can be generally referred to as save means. Optical matrix switch circuit 0101*b* can be generally referred to as optical switch means. Wavelength path division multiplexing circuit 0102*b* can be generally referred to as wavelength demultiplexing means. Wavelength variable filters 0108*b*X to 0108*b*W can be generally referred to as wavelength selection means. Optical acceptance sections 0103*b*X to 0103*b*W can be generally referred to as optical acceptance means.

Wavelength path division multiplexing circuit 0102*b* has N wavelength combining ports (hereinafter also referred to as "acceptance ports") #1 to #4 that accepts wavelength multiplexed optical signals and M wavelength splitting ports (hereinafter also referred to as "forward ports") P1 to P4 that are switchably connected to ports #1 to #4 corresponding to wavelengths of wavelength multiplexed optical signals that are input to ports #1 to #4, respectively.

Figure 7A:
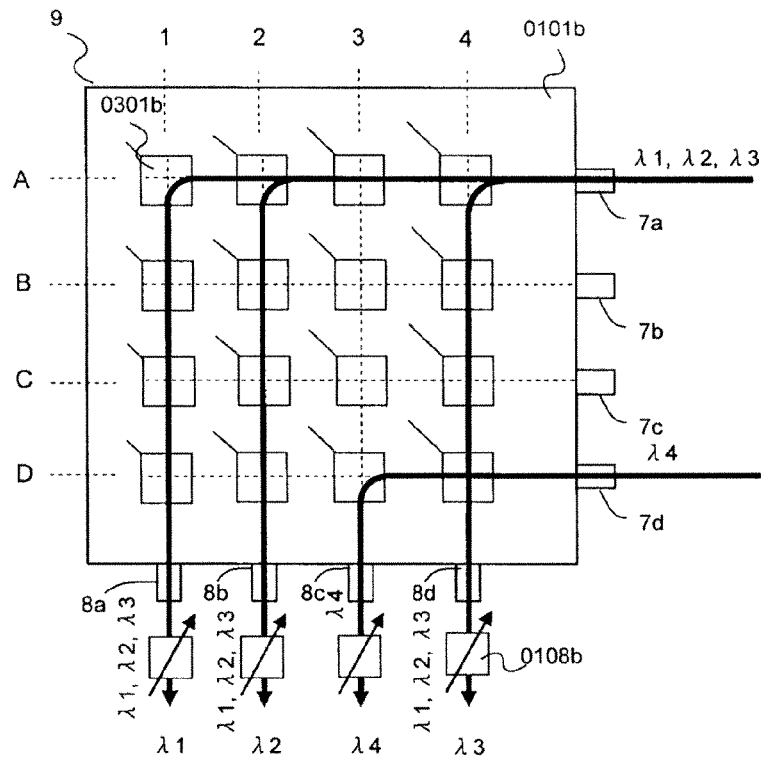
FIG. 7A is a schematic diagram describing a splitting operation of an optical matrix switch circuit.

FIG. 7A is a schematic diagram showing the configuration of optical matrix switch circuit 0101*b*. FIG. 7A is a rear side view showing the configuration of optical matrix switch circuit 0101*b* shown in FIG. 6.

Optical matrix switch circuit 0101*b* has M input ports 7*a* to 7*d* respectively connected to M forward ports P1 to P4 of wavelength path division multiplexing circuit 0102*b*, M output ports 8*a* to 8*d*, and switch section 9 that switches any one of connections of input ports 7*a* to 7*d* and output ports 8*a* to 8*d*.

Switch section 9 can be generally referred to as switch means. When switch section 9 performs a splitting connection in which one particular input port of M input ports 7*a* to 7*d* is connected to particular output ports of M output ports 8*a* to 8*d*, switch section 9 splits an optical signal that is input to a particular input port into Y split signals and respectively outputs the Y split signals to Y particular output ports. Switch section 9 splits an optical signal that is input to a particular input port into Y split signals such that the powers of the Y split signals become equal.

Switch section 9 is composed of a plurality of optical switch elements 0301*b* connected in a grid shape.

Figure 7B:
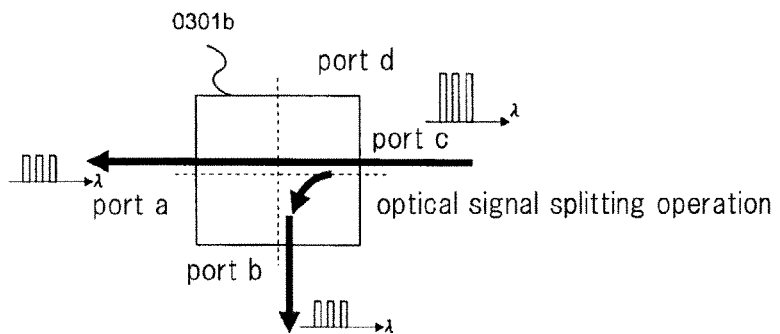
FIG. 7B is a schematic diagram describing the splitting operation of the optical matrix switch circuit.
Figure 7C:
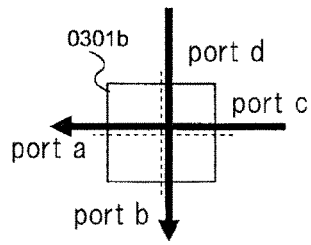
FIG. 7C is a schematic diagram describing the splitting operation of the optical matrix switch circuit.

As shown in FIG. 7B and FIG. 7C, optical switch elements 0301*b* each have port a (first output section), port b (second output section), port c (first input section), and port d (second input section). Optical switch elements 0301*b* are arranged in the same orientation and in a matrix shape of M rows by M columns.

In optical matrix switch circuit 0101*b*, the first input section of optical switch element 0301*b* of M-th column is connected to input port 7 and the second output section of optical switch element 0301*b* of M-th row (D-th row in FIG. 7A) is connected to output port 8.

As shown in FIG. 7B, by adequately adjusting the splitting and combining ratio of optical switch elements 0301*b*, they can split an optical signal that is input from port c into optical signals that are output from port a and port b.

Optical switch elements 0301*a* each can be selectively set for either the cross state, the bar state, or the splitting state.

The split state is a state in which an optical signal accepted by port c is split into two optical signals and then the split optical signals are output from port b and port a.

When the split connection is performed, optical switch elements 0301*b* each change to either the cross state, the bar state, or the split state such that an optical signal that is input to a particular input port is split into Y split signals and the Y split signals are respectively output to Y particular output ports.

In FIG. 6, M wavelength variable filters 0108*b*X to 0108*b*W are respectively connected to M output ports 8*a* to 8*d* of optical matrix switch circuit 0101*b* such that the transmission wavelengths can be selected.

Optical acceptance sections 0103*b*X to 0103*b*W are for example optical receivers or transponders. M optical acceptance sections 0103*b*X to 0103*b*W are respectively connected to wavelength variable filters 0108*b*X to 0108*b*W and receive optical signals of wavelengths that have been transmitted through wavelength variable filters 0108*b* connected to own optical acceptance sections 0103*b*X to 0103*b*W.

Storage section 2*b* stores first b connection information that represents the relationship between the connections of forward ports P1 to P4 and acceptance ports #1 to #4 of wavelength path division multiplexing circuit 0102*b* that depend on wavelengths, second b connection information that represents the relationship of the connections of forward ports P1 to P4 of wavelength path division multiplexing circuit 0102*b* and input ports 7*a* to 7*d* of optical matrix switch circuit 0101*b*, and third b connection information that represents the relationship of the connections of output ports 8*a* to 8*d* of optical matrix switch circuit 0101*b* and optical acceptance sections 0103*b*X to 0103*b*W. The first b connection information, the second b connection information, and the third b connection information are included in reception side connection information (connection information).

When control section 1*b* accepts a setup request that represents a communication port that is any one of acceptance ports #1 to #4 and Y types of communication wavelengths, control section 1b specifies Y optical acceptance sections of M optical acceptance sections 0103bX to 0103bW as reception side communication sections (communication means) that accept optical signals of Y types of communication wavelengths.

After control section 1b has specified reception side communication sections, control section 1b refers to the reception side connection information stored in storage section 2b, specifies a particular output port connected to each reception side communication section of M output ports 8a to 8d, a particular forward port connected to the communication port of M forward ports P1 to P4 of wavelength path division multiplexing circuit 0102b, a particular input port connected to the particular forward port of M input ports 7a to 7d, and a particular optical path in switch section 9 that connects the particular input port and the particular output port, sets the transmission wavelength of wavelength variable filter 0108b (particular wavelength selection means) connected to the own reception side communication section of M wavelength variable filters 0108bX to 0108bW to the communication wavelength that the reception side communication section accepts of the Y types of communication wavelengths, and controls switch section 9 such that individual particular optical paths are configured.

For example, after control section 1b has specified the reception side communication sections, control section 1b refers to the reception side connection information stored in storage section 2b, specifies a particular optical path in optical matrix switch circuit 0101b that is part of optical paths from the communication port to each reception side communication section, and sets each of optical switch devices 0301a for either the cross state, the bar state, or the split state such that individual particular optical paths are configured.

Control section 1b sets particular optical switch elements that lie where particular optical paths split of optical switch elements 0301b for the split state.

When the splitting connection is performed, each one of optical switch elements 0301b can split an optical signal that is accepted by port c at any ratio. Control section 1b sets particular optical switch elements for the split state and sets them for the splitting ratios such that the powers of split optical signals of individual wavelengths become equal.

In addition, control section 1b saves information that represents the communication ports, communication wavelengths, reception side communication sections, and particular optical paths, particular input ports, particular output ports, and particular acceptance ports that are arranged in switch section 9 to save section 3b.

When optical transmission device control circuit 0105b accepts a setup request that represents a paths and a wavelength (particular wavelength) from upper level setup means (not shown), optical transmission device control circuit 0105b refers to the first b connection information, the second b connection information, and the third b connection information stored in storage section 2b and controls wavelength variable filter control circuit 0107b and optical switch splitting and combining ratio control circuit 0106b.

Optical switch splitting and combining ratio control circuit 0106b sets optical switch devices 0301b for the splitting and combining ratios as specified by a request from optical transmission device control circuit 0105b.

Wavelength variable filter control circuit 0107b sets the transmission center wavelength of wavelength variable filter 0108bX for a wavelength that optical acceptance section 0103bX receives, sets the transmission center wavelength of wavelength variable filter 0108bY for a wavelength that optical acceptance section 0103bY receives, sets the transmission center wavelength of wavelength variable filter 0108bZ for a wavelength that optical acceptance section 0103bZ receives, and sets the transmission center wavelength of wavelength variable filter 0108bW for a wavelength that optical acceptance section 0103bW receives as requested from optical transmission device control circuit 0105b.

Figure 8:
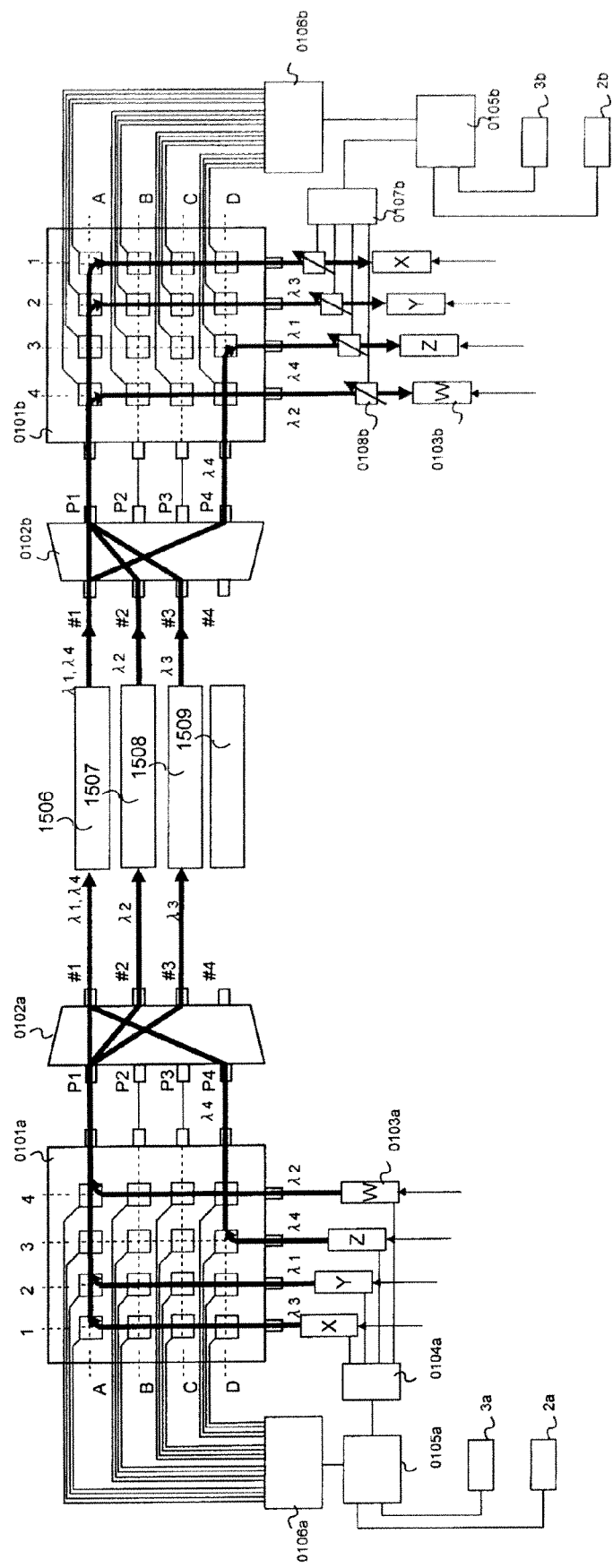
FIG. 8 is a block diagram showing a wavelength division multiplexing optical communication system.

FIG. 8 is a schematic diagram showing a wavelength division multiplexing optical communication system in which the transmission side device shown in FIG. 4 and the reception side device shown in FIG. 6 are connected through transmission lines 1506 to 1509.

Next, the operation of the system according to the first exemplary embodiment will be described.

First, with reference to FIG. 4, the operation of a transmission side device that sets a wavelength path signal for wavelength λ1—path #1 will be described.

When optical transmission device control circuit 0105a accepts a wavelength path signal setup request for wavelength λ1—path #1, optical transmission device control circuit 0105a specifies optical output section 0103aY and notifies optical transmission wavelength control circuit 0104a that the wavelength of an optical signal transmitted from optical output section 0103aY is set for λ1.

Thereafter, optical transmission device control circuit 0105a refers to the relationship of the connections of wavelength splitting ports P1 to P4 and path ports #1 to #4 of wavelength path division multiplexing circuit 0102a (first a connection information, refer to FIG. 2B) stored in storage section 2a and determines that optical matrix switch circuit 0101a needs to be set such that the optical signal transmitted from optical output section 0103aY is input to wavelength splitting port P1 of wavelength path division multiplexing circuit 0102a based on the wavelength path setting for λ1—path #1.

Thus, optical transmission device control circuit 0105a refers to the second a connection information and third a connection information and notifies optical switch splitting and combining ratio control circuit 0106a that optical switch elements D2, C2, B2, A3, and A4 are set for the OFF (cross) state without performing splitting and combining setting (setting for the combining state) and optical switch element A2 is set for a state in which a signal of wavelength λ1 (optical signal) that is input from optical switch element B2 is output to optical switch element A3 (bar state).

Optical switch splitting and combining ratio control circuit 0106a sets optical switch elements D2, C2, 82, A3, and A4 for the cross state and optical switch element A2 for the bar state as notified by optical transmission device control circuit 0105a.

Optical transmission wavelength control circuit 0104a sets the wavelength of the optical signal transmitted from optical output section 0103aY for λ1 as notified by optical transmission device control circuit 0105a.

As a result, the optical signal of wavelength λ1 transmitted from optical output section 103aY is output to path #1.

Next, operation of the transmission side device that sets a wavelength path signal for wavelength λ3—path #3 will be described.

When optical transmission device control circuit 0105a accepts a wavelength path signal setup request for wavelength λ1—path #1 followed by a wavelength path signal setup request for wavelength λ3—path #3, namely a wavelength path signal setup request for both wavelength λ1—path #1 and wavelength λ3—path #3, optical transmission device control circuit 0105a specifies optical output section 0103aX and notifies optical transmission wavelength control circuit 0104a that the wavelength of the optical signal transmitted from optical output section 0103aX is set for λ3.

Thereafter, optical transmission device control circuit 0105a refers to the relationship between the connections of wavelength splitting ports P1 to P4 and path ports #1 to #4 of wavelength path division multiplexing circuit 0102a (first a connection information, refer to FIG. 2B) stored in storage section 2a and determines that optical matrix switch circuit 0101a is set such that an optical signal transmitted from optical output section 0103aX is input to wavelength splitting port P1 of wavelength path division multiplexing circuit 0102a based on the wavelength path setting for λ3—path #3.

Thus, optical transmission device control circuit 0105a refers to the second a connection information and third a connection information stored in storage section 2a and notifies optical switch splitting and combining ratio control circuit 0106a that optical switch elements D1, C1, B1, A3, and A4 are set for the OFF (cross) state without performing splitting and combining setting (setting for the combining state) and optical switch element A1 is set for a state in which a signal of wavelength λ1 that is input from optical switch element B1 is output to optical switch element A2 (bar state).

In addition, optical transmission device control circuit 0105a notifies optical switch splitting and combining ratio control circuit 0106a that optical switch element A2 is set for the combined state at a splitting ratio of ½ such that signals of individual wavelengths that are input from two input ports are combined to one signal that is output from one output port as shown in FIG. 9.

Optical switch splitting and combining ratio control circuit 0106a sets optical switch elements D1, C1, B1, A3, and A4 for the cross state, optical switch element A1 for the bar state, and optical switch element A4 is set for the combined state at a splitting ratio of ½ as notified by optical transmission device control circuit 0105a.

When optical switch element A2 has been set for a splitting ratio of ½, optical switch element A2 outputs a signal (λ3) that is input from optical switch element A1 to optical switch element A3 with a transmission loss of 3 dB and outputs a signal (λ1) that is input from optical switch element B2 to optical switch element A3 with a transmission loss of 3 dB. Thus, assuming that the powers of the optical signals of wavelengths λ1 and λ3 that are input to optical switch element A2 are X, the power of the optical signal that is output from optical switch element A2 to optical switch element A3 becomes X.

Optical transmission wavelength control circuit 0104a sets the wavelength of the optical signal transmitted from optical output section 0103aX for λ3 as notified by optical transmission device control circuit 0105a.

As a result, the optical signal of wavelength λ3 can be input to wavelength splitting port P1 of wavelength path division multiplexing circuit 0102a to which the optical signal of wavelength λ1 has been input. Thus, the optical signal of wavelength λ3 transmitted from optical output section 0103aX is output to path #3.

Next, the operation that the transmission side device sets a wavelength path signal for wavelength λ2—path #2 will be described.

When optical transmission device control circuit 0105a accepts a wavelength path signal setup request for wavelength λ1—path #1 and wavelength λ3—path #3, followed by a wavelength path signal setup request for wavelength λ2—path #2, namely a wavelength path signal setup request for wavelength λ1—path #1, wavelength λ3—path #3, and wavelength λ2—path #2, optical transmission device control circuit 0105a specifies optical output section 0103aW and notifies optical transmission wavelength control circuit 0104a that the wavelength of an optical signal transmitted from optical output section 0103aW is set for λ2.

Thereafter, optical transmission device control circuit 0105a refers to the relationship between the connections of wavelength splitting ports P1 to P4 and path ports #1 to #4 of wavelength path division multiplexing circuit 0102a (first a connection information, refer to FIG. 2B) stored in storage section 2a and determines that optical matrix switch circuit 0101a is set such that an optical signal transmitted from optical output section 0103aW is input to wavelength splitting port P1 of wavelength path division multiplexing circuit 0102a based on the wavelength path setting for λ2—path #2.

Figure 9A:
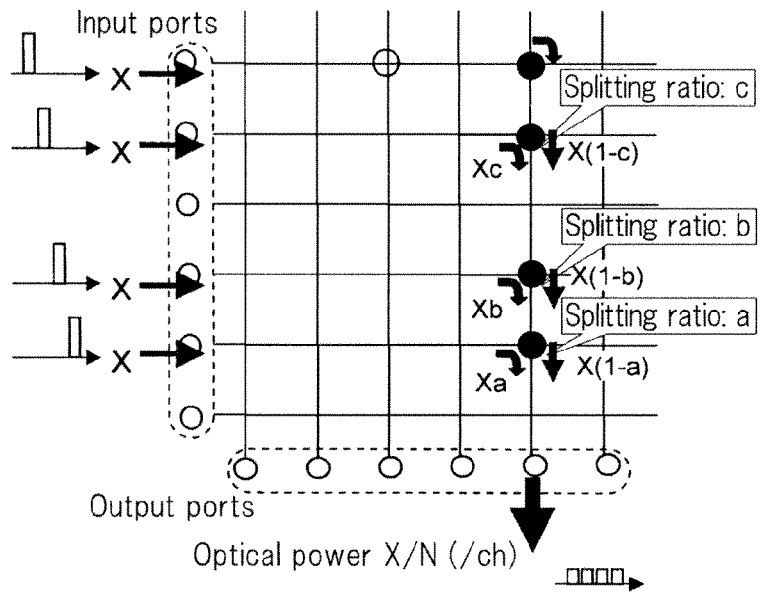
FIG. 9A is a schematic diagram describing combining and splitting operations.
Figure 9B:
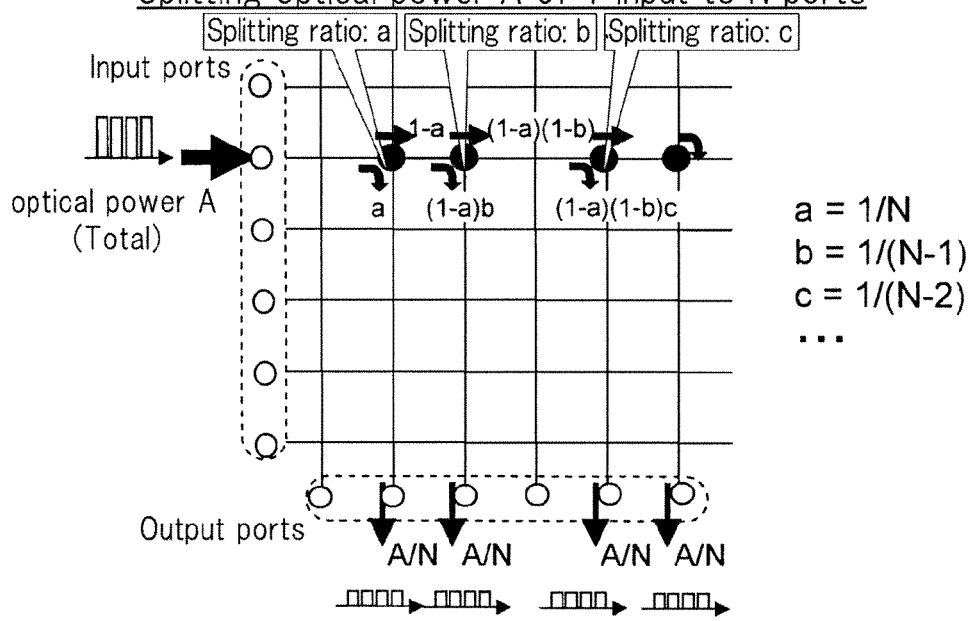
FIG. 9B is a schematic diagram describing combining and splitting operations.

Thus, optical transmission device control circuit 0105a refers to the second a connection information and third a connection information and notifies optical switch splitting and combining ratio control circuit 0106a that optical switch elements D4, C4, and B4 are set for the OFF (cross) state without performing splitting and combining setting (setting for the combined state), optical switch element A2 is kept in the wavelength path setting state for λ3—path #3, and optical switch element A4 is set for the combined state at a splitting ratio of ⅓ (refer to FIG. 9A).

Optical switch splitting and combining ratio control circuit 0106a sets optical switch elements D4, C4, and B4 for the cross state, optical switch element A2 is kept in the wavelength path setting state for λ3—path #3, and optical switch element A4 is set at a splitting ratio of ⅓ as notified by optical transmission device control circuit 0105a.

When optical switch element A4 has been set for a splitting ratio of ⅓, optical switch element A4 outputs signals (λ1, λ3) that are input from optical switch element A3 to wavelength splitting port P1 with a transmission loss of 1.8 dB and outputs a signal (λ2) that is input from optical switch element B1 to wavelength splitting port P1 with a transmission loss of 4.8 dB. Thus, assuming that the powers of the optical signals of wavelengths λ1 and λ3 that are input to optical switch element A4 are X/2, the power of the optical signal that is output from optical switch element A4 to wavelength splitting port P1 of wavelength path division multiplexing circuit 0102a becomes X ((X/2+x/2)*2/3+X/3=X).

Optical transmission wavelength control circuit 0104a sets the wavelength of an optical signal transmitted from optical output section 0103aW for λ2 as notified by optical transmission device control circuit 0105a.

As a result, the optical signal of wavelength λ2 can be input to wavelength splitting port P1 of wavelength path division multiplexing circuit 0102a to which the optical signal having wavelength λ1 and the optical signal having wavelength λ3 have been input. Thus, the optical signal having wavelength λ2 transmitted from optical output section 0103aW is output to path #2.

The foregoing operations performed by the transmission side device are the same as those performed by the reception side device except for the operation of wavelength variable filter control circuit 0107b that sets optical output section 0103a for a wavelength and that sets wavelength variable filters 0108bX to 0108bW for transmission wavelengths corresponding to wavelength path signals. In the reception side device, optical switch elements perform an optical signal splitting operation instead of an optical signal combining operation (refer to FIG. 9B).

According to this exemplary embodiment, when switch section 6 performs the combining connection, it combines Y optical signals that are input to Y particular input ports, generates a combined signal, and outputs the combined signal to a particular output port.

Thus, optical signals of different wavelengths can be transmitted to one wavelength splitting port (acceptance port) of wavelength path division multiplexing circuit 0102a. Thus, for wavelength paths through which the transmission side device transmits and receives wavelength path division multiplexed light, combinations of wavelengths and paths that are not selectable can be prevented from occurring.

In addition, switch section 6 combines Y optical signals such that the powers of Y optical signals included in a combined signal become equal. Thus, wavelength multiplexed optical signals can be prevented from deteriorating.

In addition, control section 1a refers to storage section 2a, controls switch section 6, and thereby configures particular optical paths in switch section 6. Thus, particular optical paths can be accurately configured.

In addition, save section 3a saves information, which represents the communication ports, communication wavelengths, reception side communication sections, and particular optical paths, particular input ports, particular output ports, and particular acceptance ports that are arranged, in switch section 6. Thus, information about wavelength paths that have been set up can be managed.

In addition, switch section 6 is optical matrix switch circuit 0101a in which optical switch elements 0301a are arranged in a matrix shape. In the combining connection state, optical switch elements 0301a each change to either the cross state, the bar state, or the combined state such that a combined signal is generated and the combined signal is output from a particular output port. Thus, optical signals of different wavelengths can be transmitted to one wavelength splitting port (acceptance port) of wavelength path division multiplexing circuit 0102a through optical matrix switch circuit 0101a.

By contrast, in the split connection state, switch section 9 splits an optical signal that is input to a particular input port to Y split signals and respectively outputs the Y split signals to Y particular output ports. Thus, a wavelength multiplexed optical signal transmitted from the transmission side device shown in FIG. 4 can be adequately received.

In addition, switch section 9 splits an optical signal that is input to a particular input port to Y split signals such that the powers of the Y split signals become equal. Thus, the wavelength multiplexed optical signal can be prevented from fluctuating.

Control section 1b refers to storage section 2b and controls switch section 9 and wavelength variable filters 0108bX to 0108bW so as to configure particular optical paths in switch section 9 and cause optical acceptance sections 0103b to receive optical signals of particular wavelengths that have passed through particular optical paths. Thus, optical signals of individual wavelengths included in a wavelength multiplexed optical signal transmitted from the transmission side device shown in FIG. 4 can be adequately received.

In addition, save section 3b saves information, which represents the communication ports, communication wavelengths, reception side communication sections, and particular optical paths, particular input ports, particular output ports, and particular acceptance ports that are arranged, in switch section 9. Thus, information about wavelength paths that have been set up can be managed.

In addition, switch section 9 is optical matrix switch circuit 0101b in which optical switch elements 0301b are arranged in a matrix shape. In the split connection state, optical switch elements 0301b each change to either the cross state, the bar state, or the split state such that an optical signal that is input to a particular input port is split into Y split signals and the Y split signals are respectively output to Y particular output ports. Thus, a wavelength multiplexed optical signal that is transmitted from the transmission side device shown in FIG. 4 can be adequately received.

Second Exemplary Embodiment

Next, with reference to the accompanying drawings, a second exemplary embodiment of the present invention will be described in detail. In the following, the second exemplary embodiment will be described mainly focused on the difference from the first exemplary embodiment.

According to the second exemplary embodiment, as optical switch elements included in optical matrix switch circuit 0101a shown in FIG. 4 and those included in optical matrix switch circuit 0101b shown in FIG. 6, a Mach—Zehnder interferometer type TO (Thermal Optical) switch using quartz waveguides or the like is applied. The Mach-Zehnder interferometer type TO is one piece of apparatus or one device.

Figure 10:
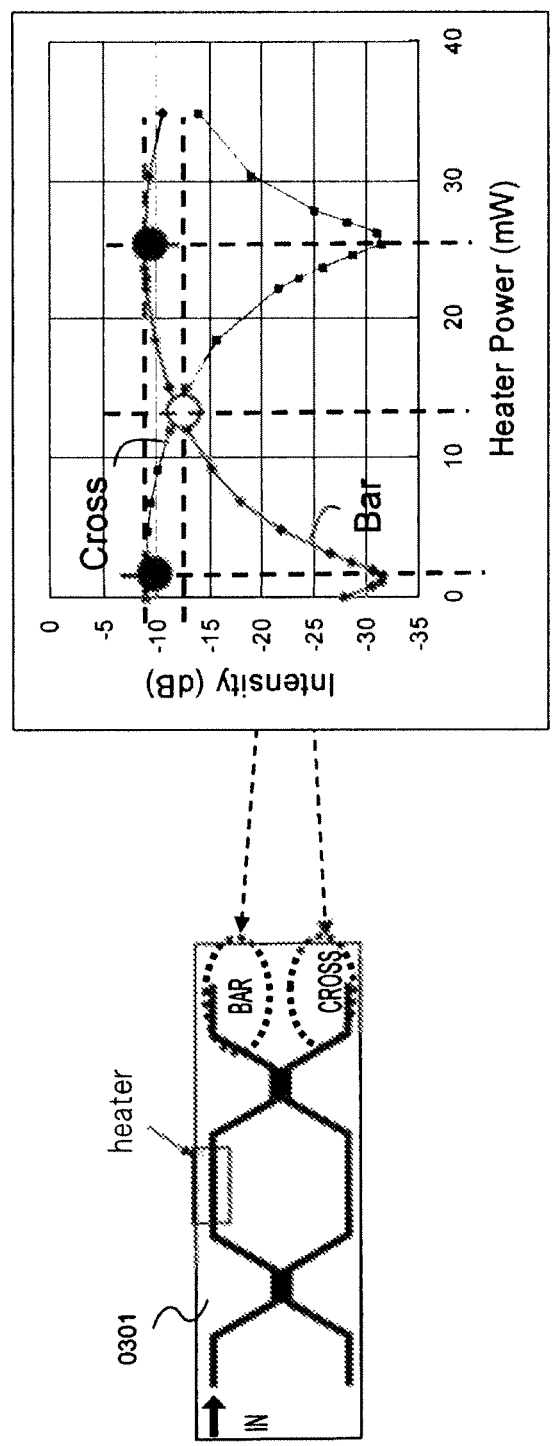
FIG. 10 is a schematic diagram describing characteristics and operation of an optical switch element according to a second exemplary embodiment of the present invention.

FIG. 10 shows transmission loss characteristics corresponding to applied heating powers of the Mach-Zehnder interferometer type optical switch.

The ON/OFF (bar/cross) operations of the Mach-Zehnder interferometer type optical switch are activated at black points on the graph shown in FIG. 10.

The optical signal combining and splitting operations of this exemplary embodiment allows applied heating powers to be adjusted corresponding to the combining and splitting ratios based on their transmission loss characteristics.

A white point on the graph shown in FIG. 10 is a point at which equal transmission loss characteristics are obtained at two output ports of the Mach-Zehnder interferometer type optical switch and have a 3 dB transmission loss.

FIG. 11A and FIG. 11B are schematic diagrams showing an 8×8 arrayed Mach-Zehnder interferometer type optical switch that uses quartz waveguides and that allows signals to be connected between eight input ports and eight output ports without blocking.

In FIG. 11A and FIG. 11B, wavelength path division multiplexing circuit 0102 is connected on the right of optical matrix switch circuit 0101.

Although FIG. 11A and FIG. 11B show an 8×8 arrayed optical matrix switch, it should be noted that this exemplary embodiment is not limited to such a switch scale.

The operation shown in FIG. 11A corresponds to the operation of the transmission side that combines optical signals obtained from a plurality of ports and outputs the combined signal from a single port as described in FIG. 4.

In FIG. 11A, optical switch splitting and combining ratio control circuit 0106b controls powers applied to the individual heaters such that optical switch elements A7, E8, and H7 are set for the fully ON state (bar state), optical switch element F5 combines an optical signal having wavelength $\lambda 1$ that is input from input port 1 and an optical signal having wavelength $\lambda 3$ that is input from port 7, and the peak levels of the optical signals that are combined become equal.

Likewise, optical switch splitting and combining ratio control circuit 0106b controls the powers applied to the individual heaters such that optical switch element G6 combines the wavelength path signal ($\lambda 1$, $\lambda 3$) that is input from optical switch element F5 and a wavelength path signal ($\lambda 2$) that is input from optical switch element F7 and the peak levels of the optical signals that are combined become equal.

As a result, optical signals having wavelengths $\lambda 1$, $\lambda 2$, and $\lambda 3$ (wavelength path signals) are combined and the combined signal is input to a wavelength splitting port of wavelength path division multiplexing circuit 0102a.

The other configuration and operation of his exemplary embodiment are the same as those of the first exemplary embodiment.

The operation shown in FIG. 11B corresponds to the operation of the reception side described in FIG. 6 that splits an optical signal that is input from a single input port and that outputs the split optical signals to a plurality of ports.

In FIG. 11B, optical switch splitting and combining ratio control circuit 0106b controls powers applied to the individual heaters such that optical switch elements A7, E8, and H7 are set for the fully ON state (bar state), optical switch element G6 splits a wavelength path signal (λ1, λ1, λ1) that is input from optical switch element H7 into optical signals, and the peak levels of the split optical signals become equal.

Likewise, optical switch splitting and combining ratio control circuit 0106b controls powers applied to the individual heaters such that optical switch element F5 splits the wavelength path signal (λ1, λ2, λ3) that is input from optical switch element G6 into optical signals and the peak levels of the optical signals that are split become equal.

As a result, wavelength path signals of wavelengths λ1, λ2, and λ3 that are combined are received by a plurality of optical acceptance sections 0103b through wavelength variable filters 0108b whose respective transmission center wavelengths have been set for wavelengths of wavelength paths through which transmission center wavelengths are received.

The other configuration and operation of this exemplary embodiment are the same as those of the first exemplary embodiment.

Figures 12A, 12B:
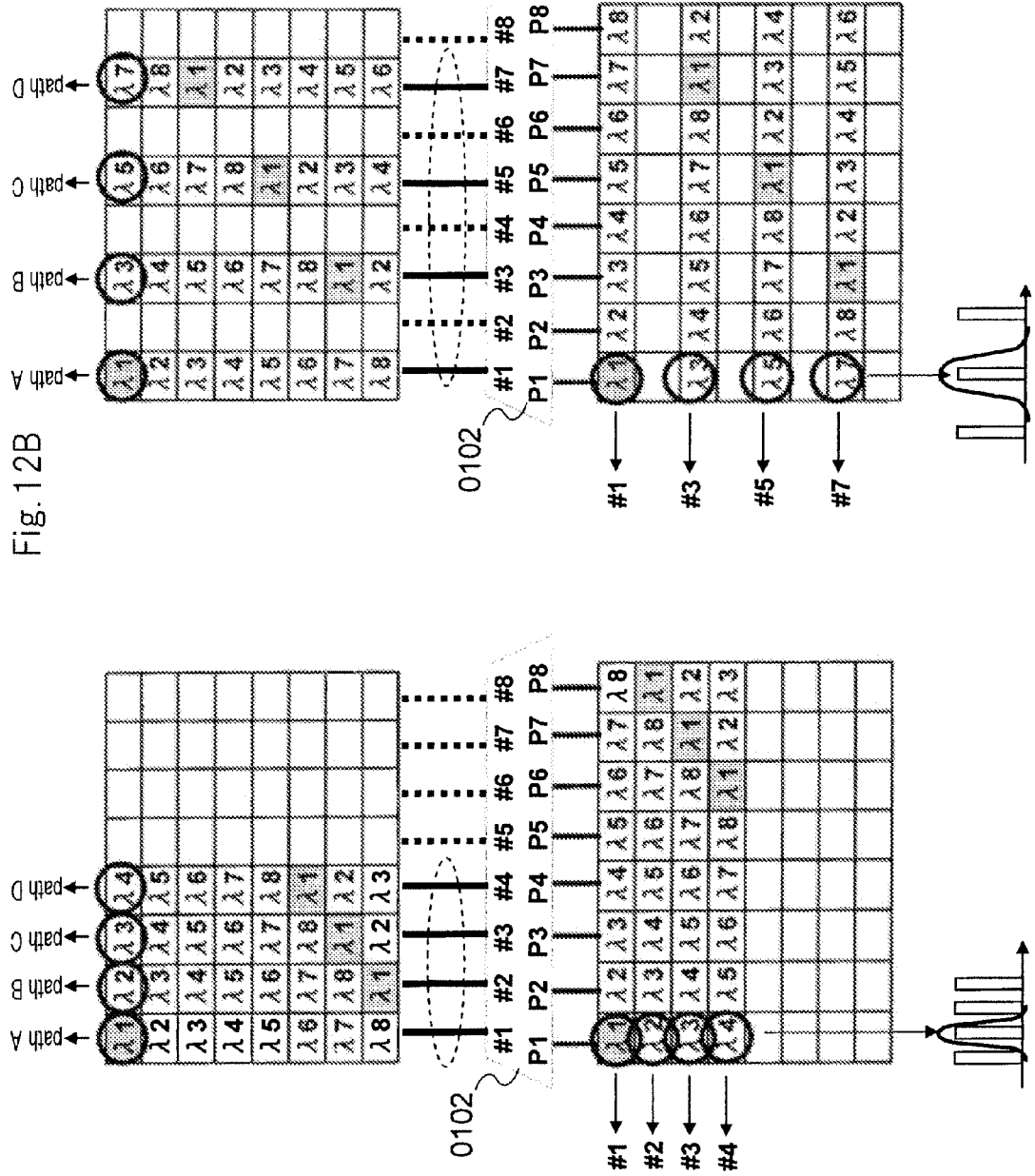
FIG. 12A is a schematic diagram describing combining and splitting operations on a wavelength path according to the second exemplary embodiment of the present invention.
FIG. 12B is a schematic diagram describing combining and splitting operations on a wavelength path according to the second exemplary embodiment of the present invention.

FIG. 12A and FIG. 12B are schematic diagrams describing the relationship of a path port selection method of wavelength path division multiplexing circuits 0102a and 0102b (hereinafter simply referred to as "wavelength path division multiplexing circuit 0102") and the wavelengths of combined wavelength paths at wavelength splitting ports.

In FIG. 12A and FIG. 12B, it is assumed that wavelength path division multiplexing circuit 0102 has wavelength splitting ports P1 to P8 and path ports #1 to #8. In addition, it is assumed that the wavelength splitting ports of wavelength path division multiplexing circuit 0102a have a wavelength interval of 100 GHz and cyclic characteristics of FSR (Free Spectrum Range)=800 GHz.

In FIG. 12A, path ports #1, 2, 3, and 4 are allocated to path A, B, C, and D, respectively. At this point, when an optical signal having wavelength λ1 that has passed through path A, an optical signal having wavelength λ2 that has passed through path B, an optical signal having wavelength λ3 that has passed through path C, and an optical signal having wavelength λ4 that has passed through path D are simultaneously and respectively input to path ports #1, #2, #3, and #4 of wavelength path division multiplexing circuit 0102, the optical signals of wavelengths λ1, λ2, λ3, and λ4 (wavelength path signals) are output to wavelength splitting port P1 (refer to FIG. 2B).

Since only necessary wavelengths are selected from four wavelength path signals at an interval of 100 GHz, the center transmission frequencies of wavelength variable filters 0108b are adjusted to the wavelengths of the wavelength path signals to be selected.

In FIG. 12B, path ports #1, 3, 5, and 7 are allocated to path A, B, C, and D, respectively. At this point, when an optical signal having wavelength λ1 that has passed through path A, an optical signal having wavelength λ3 that has passed through path B, an optical signal having wavelength λ5 that has passed through path C, and an optical signal having wavelength λ7 that has passed through path D are simultaneously and respectively input to path ports #1, #3, #5, and #7 of wavelength path division multiplexing circuit 0102, the optical signals having wavelengths λ1, λ3, λ5, and λ7 (wavelength path signals) respectively are output to wavelength splitting port P1 (refer to FIG. 2B).

Since only necessary wavelengths are selected from four wavelength path signals at an interval of 200 GHz, the center transmission frequencies of wavelength variable filters 0108b are adjusted to the wavelengths of the wavelength path signals to be selected.

Since the interval of frequencies of wavelengths allocated to path ports is increased as shown in FIG. 12B, the interval of wavelengths of wavelength path signals that are combined and output to wavelength splitting ports becomes long, the filter characteristics required for wavelength variable filters 0108b become smooth, and the cost of the system can be reduced.

Third Exemplary Embodiment

Next, with reference to the accompanying drawings, a third exemplary embodiment of the present invention will be described in detail. In the following, the third exemplary embodiment will be described mainly focused on the difference from the first exemplary embodiment.

Figure 13:
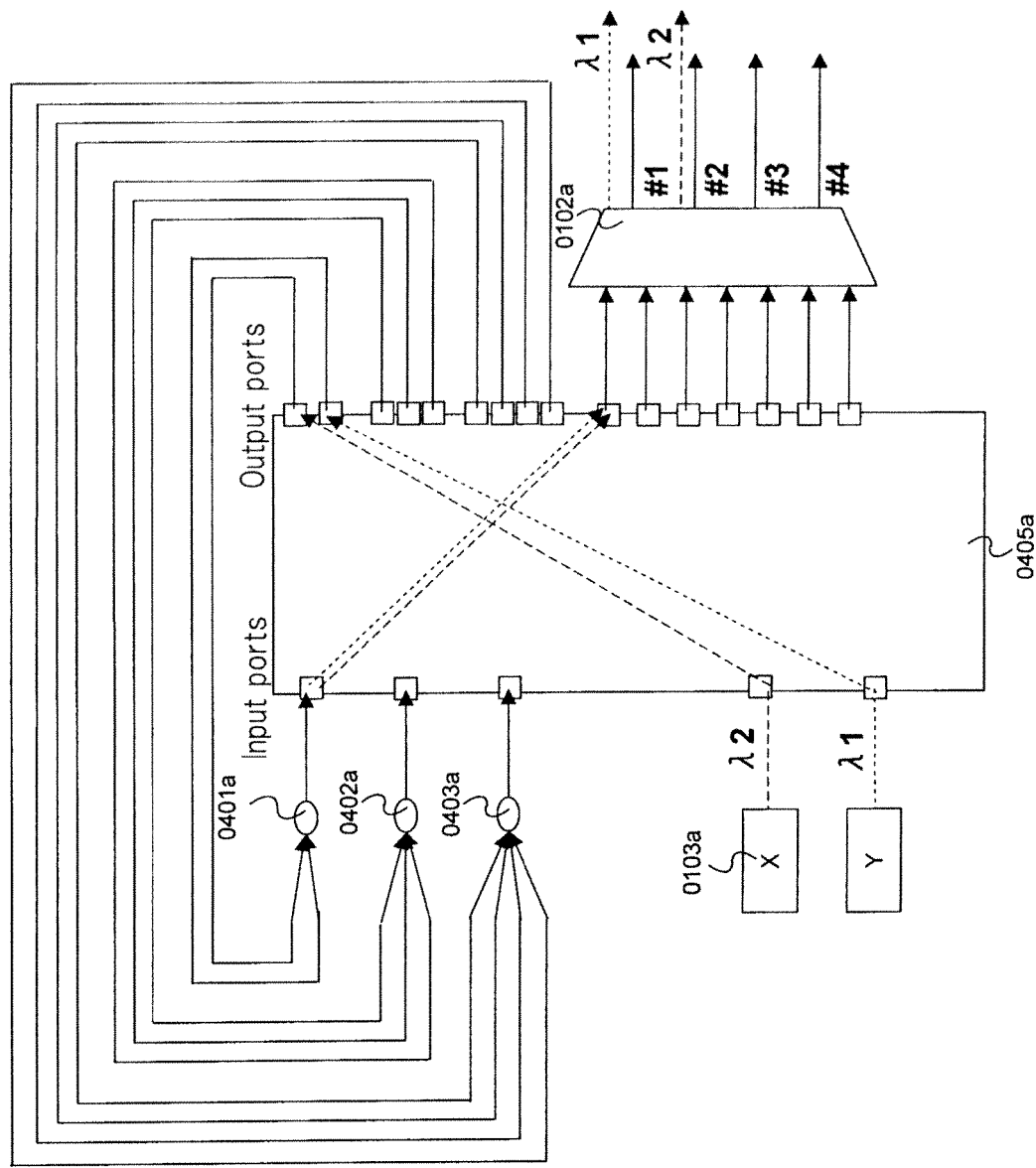
FIG. 13 is a schematic diagram describing a combining operation on a wavelength path according to a third exemplary embodiment of the present invention.

FIG. 13 is a schematic diagram showing a transmission side device that uses MEMS (Micro Electro Mechanical System) optical matrix switch (output switch means) 0405a, 2:1 combining and splitting optical coupler (generation means) 0401a, 3:1 combining and splitting optical coupler (generation means) 0402a, and 4:1 combining and splitting optical coupler (generation means) 0403a as optical matrix switch circuit 0101a shown in FIG. 4.

Figure 14:
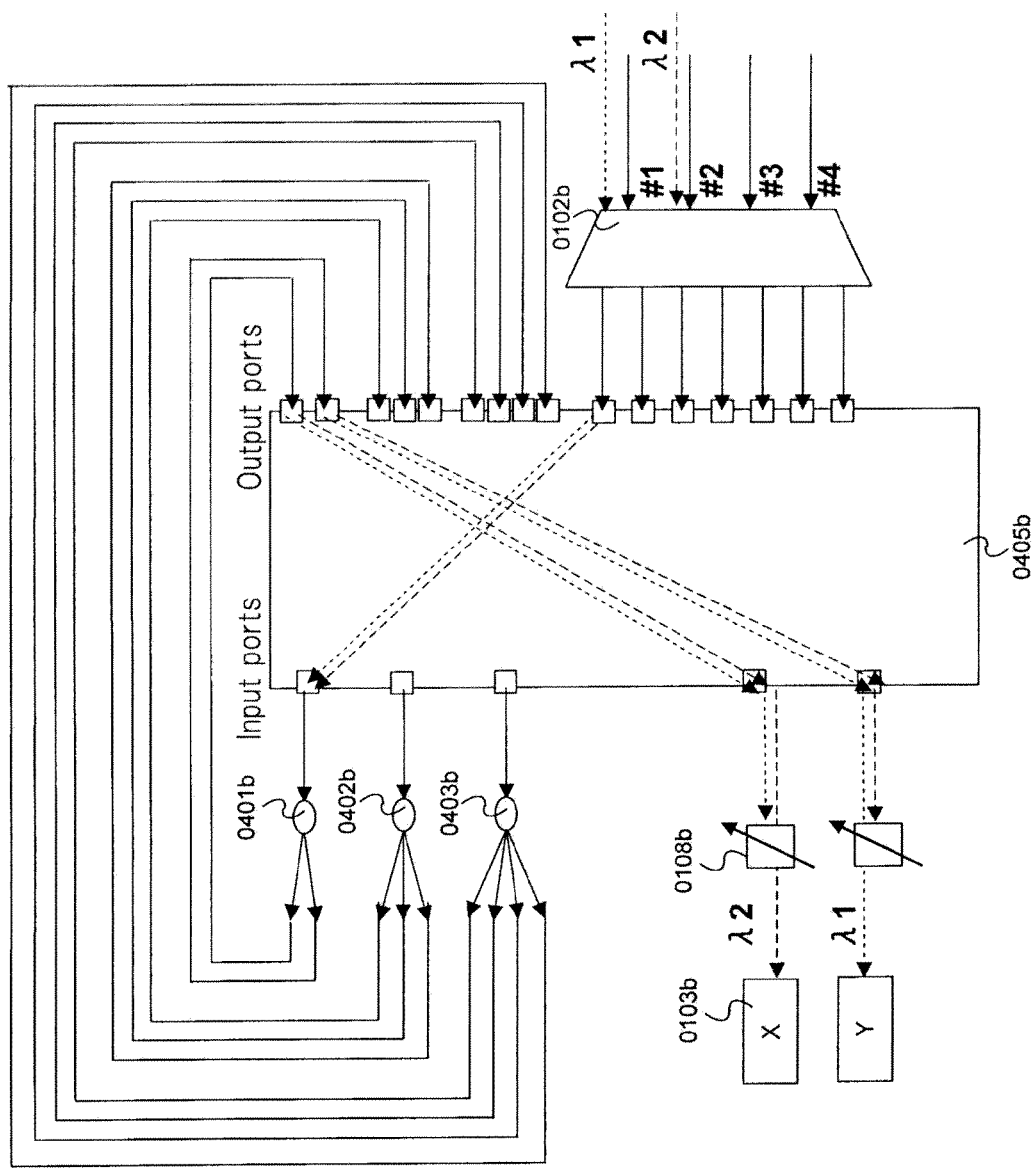
FIG. 14 is a schematic diagram describing a splitting operation on a wavelength path according to the third exemplary embodiment of the present invention.

FIG. 14 is a schematic diagram showing a reception side device that uses MEMS optical matrix switch (output switch means) 0405b, 2:1 combining and splitting optical coupler (splitting means) 0401b, 3:1 combining and splitting optical coupler (splitting means) 0402b, and 4:1 combining and splitting optical coupler (splitting means) 0403b as optical matrix switch circuit 0101b shown in FIG. 6.

According to this exemplary embodiment, the optical matrix switch circuit is not limited to an MEMS optical matrix switch as long as input and output ports can be connected without blocking.

Figure 1A:
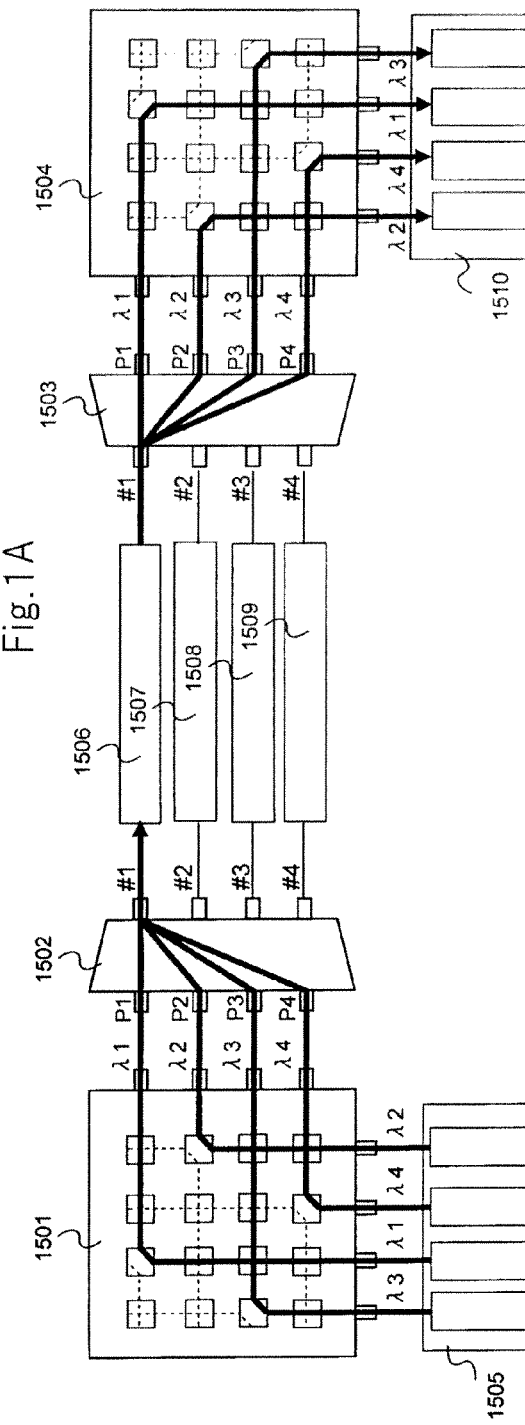
FIG. 1A is a schematic diagram showing a WDM system.
Figure 1B:
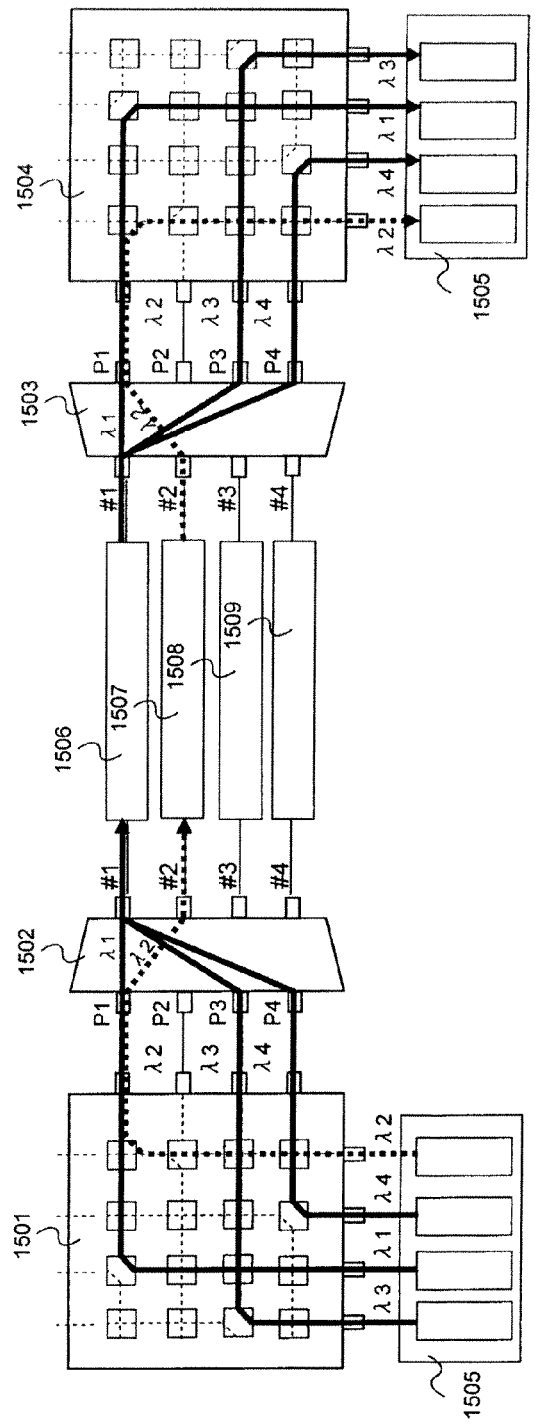
FIG. 1B is a schematic diagram showing a WDM system.
Figure 3A:
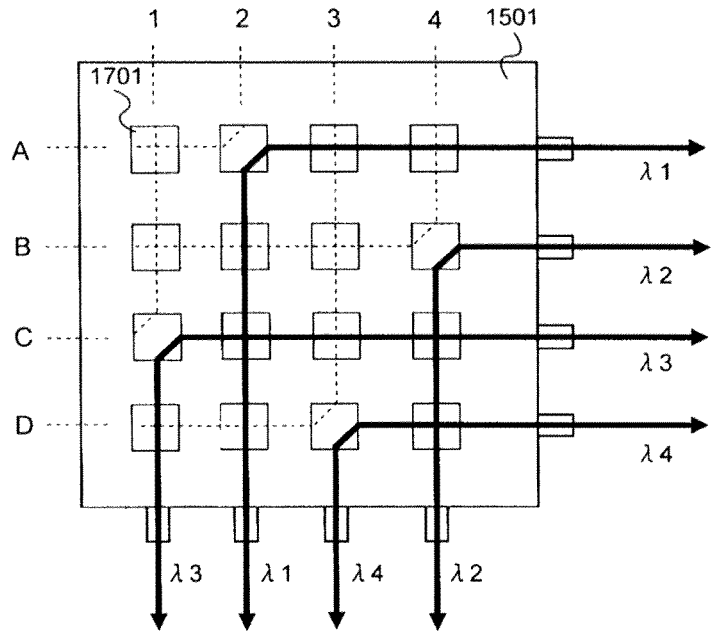
FIG. 3A is a schematic diagram showing an example of the configuration of an optical matrix switch.
Figure 3B:
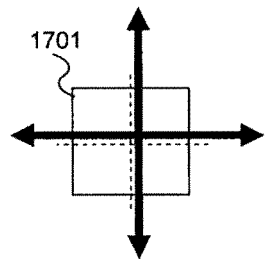
FIG. 3B is a schematic diagram describing the operation of a switch element.
Figure 3C:
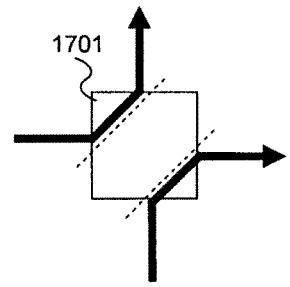
FIG. 3C is a schematic diagram describing the operation of a switch element.

In MEMS optical matrix switches 0405a and 0405b, optical switch elements shown in FIG. 3A are arranged in the same orientation and in a matrix shape.

The maximum value of N of N:1 combining and splitting couplers depends on the number of corresponding paths. In FIG. 13 and FIG. 14, assuming that wavelength path division multiplexing circuit 0102 corresponds to a maximum of four paths, a 4:1 combining and splitting coupler needs to be provided.

Since the number of optical output sections or optical acceptance sections that can be connected to eight wavelength splitting ports shown in FIG. 13 and FIG. 14 is a maximum of eight, two 4:1 combining and splitting optical couplers, two 3:1 combining and splitting optical couplers, and four 2:1 combining and splitting optical couplers need to be provided (partly omitted in FIG. 13 and FIG. 14).

The other configuration of the device is the same as that shown in FIG. 4 and FIG. 6 (omitted in FIG. 13 and FIG. 14).

Next, with reference to FIG. 13, the operation that sets wavelength path signals of wavelengths λ1 and λ2 transmitted form optical output section 0103 to path ports #1 and #2 of wavelength path division multiplexing circuit 0102 will be described.

When optical transmission device control circuit 0105a accepts a wavelength path transmission setup request (λ1—path #1, λ2—path #2), optical transmission device control circuit 0105a refers to storage section 2a and determines that wavelength paths of wavelength λ1 and λ2 need to be input to wavelength splitting port P1.

In addition, since the setup request is issued for two wavelength paths, optical transmission device control circuit 0105a refers to storage section 2a and controls optical switch splitting and combining ratio control circuit 0106a so as to combine the wavelength path signals using 2:1 combining and splitting coupler 0401a.

In addition, optical transmission device control circuit 0105a controls optical switch splitting and combining ratio control circuit 0106a so as to input the combined wavelength path signal (λ1, λ2) to wavelength splitting port P1 of wavelength path division multiplexing circuit 0102.

As a result, wavelength paths of λ1—path #1 and λ2—path #2 are set.

Next, with reference to FIG. 14, the operation that sets wavelength path signals of λ1—path #1 and λ2—path #2 that are received by optical acceptance sections 0103bY and 0103bX will be described.

When optical transmission device control circuit 0105b accepts a wavelength path reception setup request (λ1—path #1 and λ2—path #2), optical transmission device control circuit 0105b refers to storage section 2b and determines that wavelength paths of wavelength λ1 and λ2 are output from wavelength splitting port P1.

In addition, since the setup request is issued for two wavelength paths, optical transmission device control circuit 0105b refers to storage section 2a and controls optical switch splitting and combining ratio control circuit 0106b so as to split the wavelength path signal using 2:1 combining and splitting coupler 0401b.

In addition, optical transmission device control circuit 0105b refers to storage section 2a and controls optical switch splitting and combining ratio control circuit 0106b so as to output split wavelength path signals (λ1, λ2) to ports connected to optical acceptance section 0103bX of ports of wavelength path division multiplexing circuit 0102b.

In addition, optical transmission device control circuit 0105b controls wavelength variable filter control circuit 0107b so as to set the transmission center frequency of wavelength variable filter 0108bX for the wavelength of the wavelength path signal that optical acceptance section 0103bX receives=λ2. Moreover, optical transmission device control circuit 0105b controls wavelength variable filter control circuit 0107b so as to set the transmission center frequency of wavelength variable filter 0108bY for wavelength λ1 with respect to optical acceptance section 0103bY.

As a result, wavelength paths of λ1—path #1 and λ2—path #2 are set.

Fourth Exemplary Embodiment

Next, with reference to the accompanying drawings, a fourth exemplary embodiment of the present invention will be described in detail.

Figure 15:
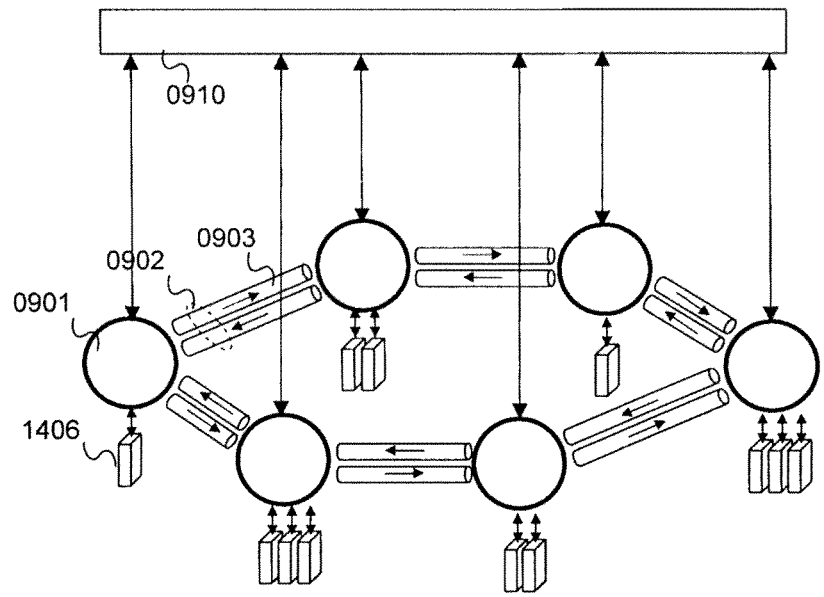
FIG. 15 is a schematic diagram showing an example of the configuration of a wavelength path network system.
Figure 16:
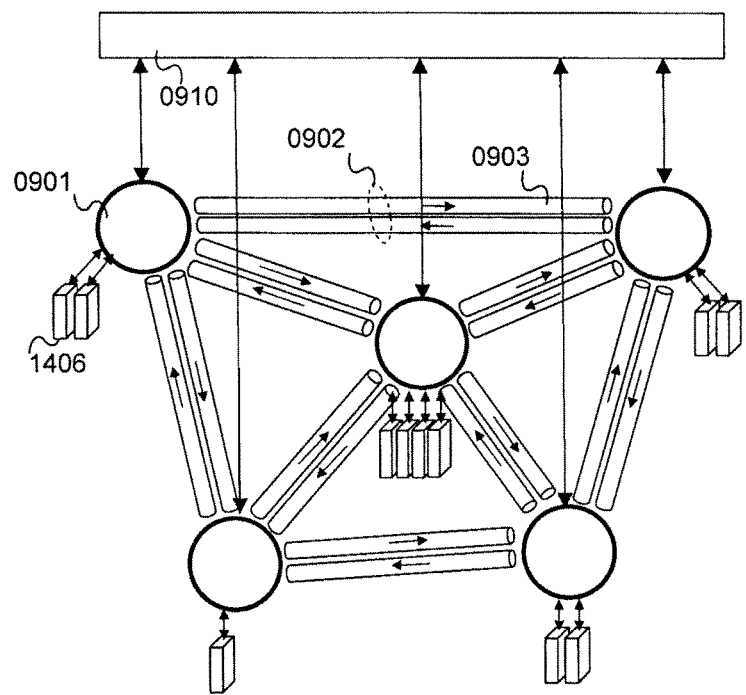
FIG. 16 is a schematic diagram showing an example of the configuration of a wavelength path network system.

FIG. 15 and FIG. 16 are schematic diagrams showing a WDM wavelength path system in which a plurality of nodes are arranged each node including a wavelength path division multiplexing transmission device having a transmission side device and a reception side device according to any one of the foregoing exemplary embodiments.

The WDM wavelength path system includes wavelength network node 0901 having wavelength cross connect (WXC) function; transponder (optical output means and optical acceptance means) 1406; optical fiber 0903; transmission line 0902; and wavelength network management control device 0910. Wavelength network node 0901, transponder 1406, and wavelength network management control device 0910 are included in each node of the WDM wavelength path system.

Each node multiplexes or demultiplexes wavelength paths for a plurality of wavelength path multiplexed transmission lines. Wavelength paths are configured between an optical output section (for example, a transponder) included in one of any two nodes and an optical acceptance section (for example, a transponder) included in the other of any two nodes.

The WDM wavelength path system can be configured as any network topology such as a ring topology shown in FIG. 15 and a mesh topology shown in FIG. 16.

Figure 17:
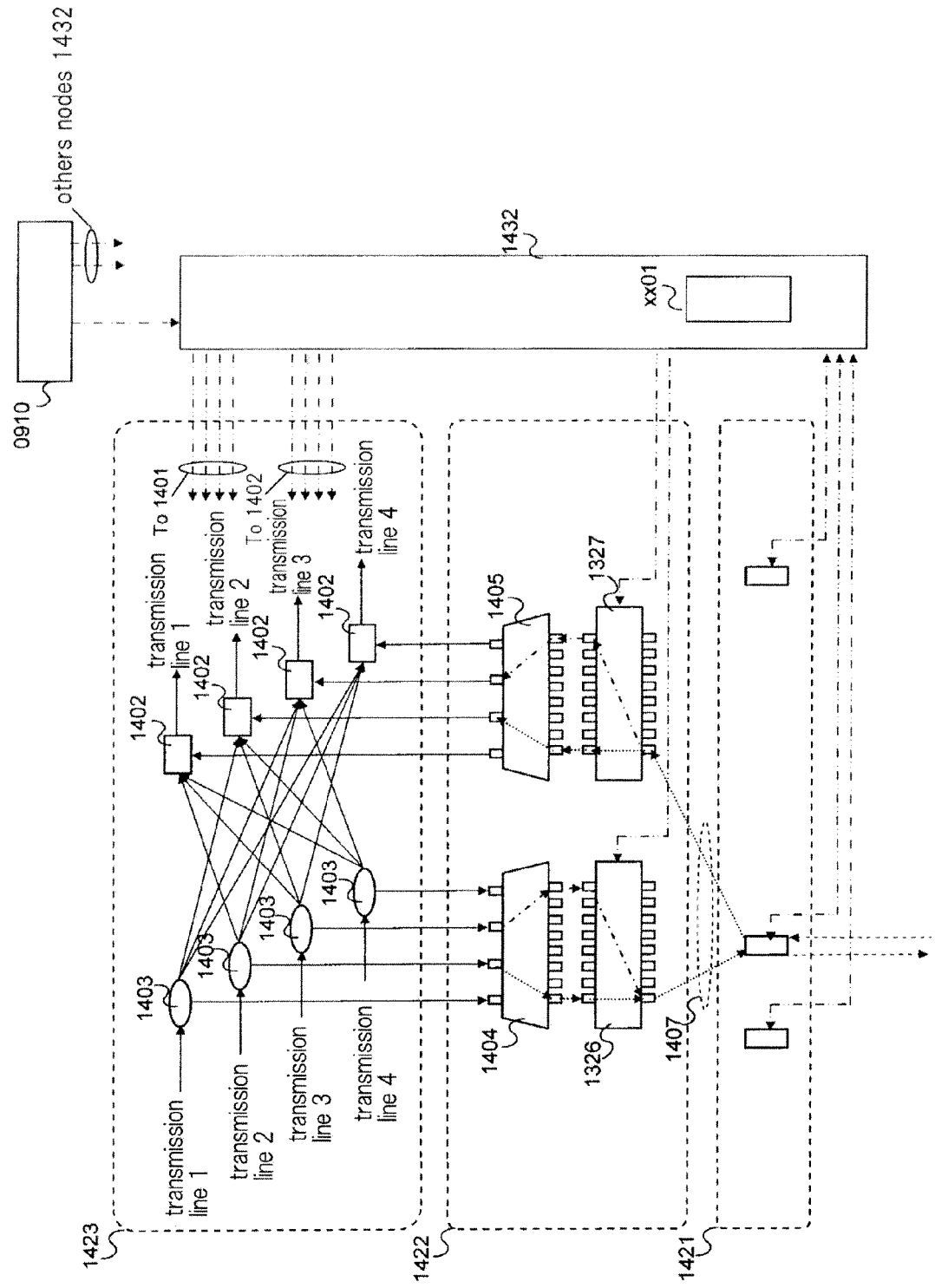
FIG. 17 is a schematic diagram showing a system according to a fourth exemplary embodiment of the present invention.

FIG. 17 is a schematic diagram showing node 0901 that has a wavelength path division multiplexing optical transmission device having a transmission side device and a reception side device according to any one of the foregoing exemplary embodiments.

Node 0901 includes WDM line section 1423, transponder accommodation function section 1422, transponder 1421, and optical transmission device control circuit 1432. Transponder accommodation function section 1422 includes wavelength path division multiplexing sections 1404 and 1405.

Wavelength path division multiplexing section 1404 is wavelength path division multiplexing circuit 0102b on the reception side shown in FIG. 6. Wavelength path division multiplexing section 1405 is wavelength path division multiplexing circuit 0102a shown in FIG. 4. Optical matrix switch circuit 1326 is optical matrix switch circuit 0101b on the reception side shown in FIG. 6. Optical matrix switch circuit 1327 is optical matrix switch circuit 0101a on the transmission side shown in FIG. 4.

WDM line section 1423 includes a plurality of optical splitting couplers 1403 and a plurality of wavelength selection circuits 1402. Optical splitting couplers 1403 can be generally referred to as optical power splitting means. Wavelength selection circuits 1402 can be generally referred to as wavelength selection switch means.

WDM line section 1423 multiplexes the wavelengths of optical signals that transponder 1421, which is disposed in the node, transmits so as to generate a WDM line signal, or WDM line section 1423 demultiplexes the wavelength of a WDM line signal so as to generate optical signals that transponder 1421 receives.

In addition, WDM line section 1423 has a function that outputs an optical signal of a wavelength that enters this node to an appropriate path.

Optical splitting couplers 1403 are respectively connected to a plurality of wavelength path multiplexed transmission lines. In addition, wavelength selection circuits 1402 are respectively connected to a plurality of wavelength path multiplexed transmission lines.

Optical splitting couplers 1403 each split a wavelength multiplexed optical signal that is input from the wavelength path multiplexed transmission line connected to its own optical splitting coupler to its own node into two signals, outputs one wavelength multiplexed optical signal to wavelength selection circuit 1402 connected to another wavelength path multiplexed transmission line of the plurality of wavelength selection circuits 1402, and outputs the other wavelength multiplexed optical signal to an acceptance port of wavelength path division multiplexing section 1404 of its own node.

Wavelength selection circuits 1402 each accept a wavelength multiplexed optical signal from optical splitting couplers 1403 and a wavelength multiplexed optical signal from a forward port of wavelength path division multiplexing section 1405 included in its own node and outputs any one of the accepted wavelength multiplexed optical signals to a wavelength path multiplexed transmission line connected to its own wavelength selection circuit 1402.

Figure 18:
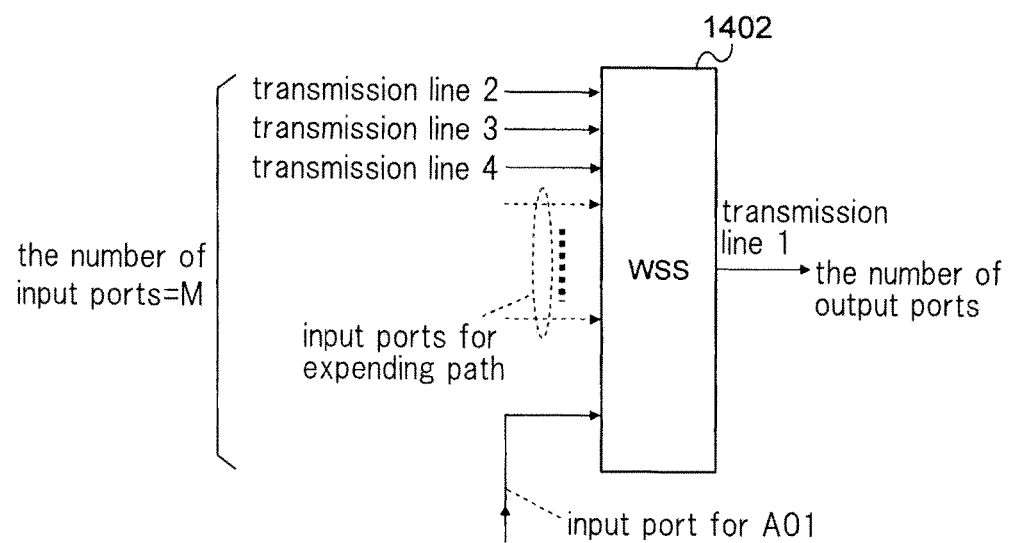
FIG. 18 is a schematic diagram showing a WSS.

FIG. 18 is a schematic diagram showing an input and output interface of wavelength selection circuit (WSS) 1402. Wavelength selection circuit (WSS) 1402 has ports that input any wavelength multiplexed optical signals that are input from individual transmission lines through optical splitting couplers 1403, an add input port (A01 input port) that accepts a wavelength multiplexed optical signal that is output from transponder accommodation function section 1422 disposed in the node, and an output port that selectively outputs any wavelength multiplexed optical signal from all wavelength multiplexed optical signals that have been input.

Transponder accommodation function section 1422 and transponder 1421 have the configurations shown in FIG. 4 and FIG. 6 or those shown in FIG. 13 and FIG. 14.

Transponder accommodation function section 1422 and transponder 1421 have functions as described in the second exemplary embodiment or second exemplary embodiment.

Figure 19:
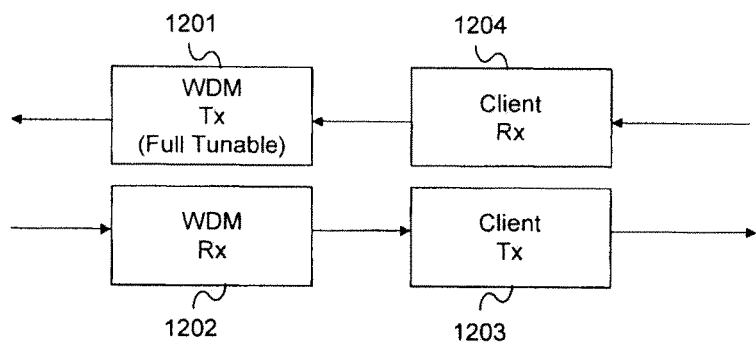
FIG. 19 is a schematic diagram describing a transponder.

As shown in FIG. 19, transponder 1421 has full tunable wavelength variable optical transmitter 1201, optical receiver 1202, client signal processing optical transmitter 1204, and client signal processing optical receiver 1203.

The operation of this exemplary embodiment is the same as that described in the foregoing first exemplary embodiment or second exemplary embodiment except that optical transmission device control circuit 1432 needs to control and set a wavelength selection switch for wavelength selection circuits 1402 of WDM line section 1423.

The configuration of this exemplary embodiment allows a signal of a particular wavelength to be set between any nodes in any network topology having any number of wavelength network nodes.

Next, the effects of the foregoing exemplary embodiments will be described.

As a first effect, with respect to wavelength paths through which signals are transmitted and received by the wavelength path division multiplexing transmission device, combinations of wavelengths and paths that are not selectable can be prevented from occurring.

This is because a plurality of wavelength paths having different wavelengths can be accommodated between connection ports of the optical matrix switch circuit as the wavelength path switching and combining and splitting means and the wavelength path division multiplexing section.

As a second effect, since wavelength distinguishing characteristics required for wavelength variable filters are simplified, the cost of the system can be reduced.

This is because wavelength path combining ports of the wavelength path division multiplexing section are allocated to paths at a large interval, the wavelength interval of wavelength paths that share the same output ports in the optical matrix switch circuit can be widened.

The present invention has been described with reference to the exemplary embodiments. However, it should be understood by those skilled in the art that the configuration and details of the present invention may be changed in various manners without departing from the scope of the present invention.

The present application claims a priority based on Japanese Patent Application JP 2009-233510 filed on Oct. 7, 2009, the entire contents of which are incorporated herein by reference in its entirety.

DESCRIPTION OF REFERENCE NUMERALS

1501 Optical matrix switch circuit
0103 Transponder optical transmitter or receiver
0102 Wavelength path division multiplexing circuit
1506, 1507, 1508, 1509 Transmission lines or networks
0301, 1701 Optical switch elements
0101 Optical matrix switch circuit
0106 Optical switch splitting and combining ratio control circuit
0105, 0805 Optical transmission device control circuit
0104 Optical transmission wavelength control circuit
0107 Wavelength variable filter control circuit
0108 Wavelength variable filter
1201 Full tunable wavelength variable optical transmitter
1202 Optical receiver
1203 Client signal processing optical receiver
1204 Client signal processing optical transmitter
1402 Wavelength selection circuit
1403 Optical splitting couplers
1423 WDM line section
1422 Transponder accommodation function section
1421 Transponder
1432 Wavelength path division multiplexing optical transmission device control circuit
0910 Wavelength network management control device

What is claimed is:

1. An optical signal transmission device, comprising:
    M (where M is an integer equal to or greater than 2) optical output units that output optical signals having different wavelengths;
    an optical switch unit that comprises M input ports respectively connected to said M optical output units, M output ports, and a switch unit that switches connections between said input ports and said output ports; and
    a wavelength multiplexing unit that has M acceptance ports respectively connected to said M output ports, and N (where N is an integer equal to or greater than 2 and equal to or smaller than M) forward ports switchably connected to said acceptance ports corresponding to wavelengths of optical signals that are input to said acceptance ports, said wavelength multiplexing unit transmitting multiplexed optical signals corresponding to optical signals accepted by said acceptance ports from said forward ports,
    wherein when said switch unit performs a combining connection in which Y (where Y is an integer equal to or greater than 2 and equal to or smaller than M) particular input ports from among said M input ports are connected to one particular output port from among said M output ports, said switch unit combines Y optical signals that are input to said Y particular input ports in order to generate a combined signal, and outputs the combined signal to said particular output port.

2. The optical signal transmission device according to claim 1,
    wherein said switch unit combines the Y optical signals such that powers of the Y optical signals included in said combined signal become equal.

3. The optical signal transmission device according to claim 1, further comprising:
- a storage unit that stores connection information that represents a relationship between connections of said forward ports and said reception ports, a relationship between connections of said acceptance ports and said output ports, and a relationship between connections of said input ports and said optical output unit; and
- a control unit that specifies Y optical output units of said M optical output unit as communication units that outputs optical signals having said Y types of communication wavelengths when said control unit accepts a setup request that represents a communication port that comprises any one of said forward ports and the Y types of communication wavelengths, refers to the connection information stored in said storage unit, specifies said particular input port that is connected to each communication unit of said M input ports, specifies a particular acceptance port that is connected to said communication port of said M acceptance ports, specifies said particular output port that is connected to said particular acceptance port of said M output ports, and specifies a particular optical path in said switch unit, said particular optical path connecting said particular input port and said particular output port, and controls said switch unit such that the particular optical paths are configured.

4. The optical signal transmission device according to claim 3, further comprising:
- a save unit,
- wherein said control unit saves information that represents said communication ports, said communication wavelengths, said communication unit, and the particular optical paths, said particular input ports, said particular output ports, and said particular acceptance ports that are arranged in said switch unit to said save unit.

5. The optical signal transmission device according to claim 1,
- wherein said switch unit comprises an optical matrix switch in which optical switch elements each have first and second input sections and first and second output sections that are arranged in a same orientation and in a matrix shape of M rows by M columns, the first input section of the optical switch element of M-th row being connected to said input port, the second output section of the optical switch element of M-th column being connected to said output port, and
- wherein when said combining connection is performed, said optical switch elements each change to either a cross state, a bar state, or a combined state in which an optical signal accepted by said first input section and an optical signal accepted by said second input section are combined and the combined signal is output from said second output section so as to generate said combined signal and output the combined signal from said particular output port.

6. The optical signal transmission device according to claim 1,
- wherein said switch unit includes:
- a generation unit that generates said combined signal when said optical switch elements perform said combining connection; and
- an output switch unit that outputs the combined signal generated by said generation unit to said particular output port.

7. The optical signal transmission device according to claim 2, further comprising:
- a storage unit that stores connection information that represents a relationship between connections of said forward ports and said reception ports, a relationship between connections of said acceptance ports and said output ports, and a relationship between connections of said input ports and said optical output unit; and
- a control unit that specifies Y optical output units of said M optical output unit as communication units that outputs optical signals having said Y types of communication wavelengths when said control unit accepts a setup request that represents a communication port that is any one of said forward ports and the Y types of communication wavelengths, refers to the connection information stored in said storage unit, specifies said particular input port that is connected to each communication unit of said M input ports, specifies a particular acceptance port that comprises connected to said communication port of said M acceptance ports, specifies said particular output port that is connected to said particular acceptance port of said M output ports, and specifies a particular optical path in said switch unit, said particular optical path connecting said particular input port and said particular output port, and controls said switch unit such that the particular optical paths are configured.

8. The optical signal transmission device according to claim 2,
- wherein said switch unit comprises an optical matrix switch in which optical switch elements each have first and second input sections and first and second output sections that are arranged in a same orientation and in a matrix shape of M rows by M columns, the first input section of the optical switch element of M-th row being connected to said input port, the second output section of the optical switch element of M-th column being connected to said output port, and
- wherein when said combining connection is performed, said optical switch elements each change to either a cross state, a bar state, or a combined state in which an optical signal accepted by said first input section and an optical signal accepted by said second input section are combined and the combined signal is output from said second output section so as to generate said combined signal and output the combined signal from said particular output port.

9. The optical signal transmission device according to claim 3,
- wherein said switch unit comprises an optical matrix switch in which optical switch elements each have first and second input sections and first and second output sections that are arranged in a same orientation and in a matrix shape of M rows by M columns, the first input section of the optical switch element of M-th row being connected to said input port, the second output section of the optical switch element of M-th column being connected to said output port, and
- wherein when said combining connection is performed, said optical switch elements each change to either a cross state, a bar state, or a combined state in which an optical signal accepted by said first input section and an optical signal accepted by said second input section are combined and the combined signal is output from said second output section so as to generate said combined signal and output the combined signal from said particular output port.

10. The optical signal transmission device according to claim 4,
  wherein said switch unit comprises an optical matrix switch in which optical switch elements each have first and second input sections and first and second output sections that are arranged in a same orientation and in a matrix shape of M rows by M columns, the first input section of the optical switch element of M-th row being connected to said input port, the second output section of the optical switch element of M-th column being connected to said output port, and
  wherein when said combining connection is performed, said optical switch elements each change to either a cross state, a bar state, or a combined state in which an optical signal accepted by said first input section and an optical signal accepted by said second input section are combined and the combined signal is output from said second output section so as to generate said combined signal and output the combined signal from said particular output port.

11. The optical signal transmission device according to claim 2, wherein said switch unit includes:
  a generation unit that generates said combined signal when said optical switch elements perform said combining connection; and
  an output switch unit that outputs the combined signal generated by said generation unit to said particular output port.

12. The optical signal transmission device according to claim 3, wherein said switch unit includes:
  a generation unit that generates said combined signal when said optical switch elements perform said combining connection; and
  an output switch unit that outputs the combined signal generated by said generation unit to said particular output port.

13. The optical signal transmission device according to claim 4, wherein said switch unit includes:
  a generation unit that generates said combined signal when said optical switch elements perform said combining connection; and
  an output switch unit that outputs the combined signal generated by said generation unit to said particular output port.

14. An optical signal reception device, comprising:
  a wavelength demultiplexing unit that has N (where N is an integer equal to or greater than 2) acceptance ports that accept wavelength multiplexed optical signals and M (where M is an integer equal to or greater than N) acceptance ports that are switchably connected to said acceptance ports corresponding to wavelengths of the wavelength multiplexed optical signals that are input to said acceptance ports;
  an optical switch unit that comprises M input ports respectively connected to said M forward ports, M output ports, and a switch unit that switches connections between said input ports and said output ports;
  M wavelength selection units that are respectively connected to said M output ports and that are capable of selecting transmission wavelengths;
  M optical acceptance units that are respectively connected to said M wavelength selection units and that receive optical signals that have been transmitted through said wavelength selection units connected to their own wavelength selection units;
  a storage unit that stores connection information that represents a relationship between connections of said acceptance ports and said forward ports, a relationship between connections of said forward ports and said input ports, and a relationship between connections of said output ports and said optical acceptance unit; and
  a control unit that specifies Y optical acceptance units of said M optical acceptance units as communication units that accept optical signals having said Y communication wavelengths when said control unit accepts a setup request that represents a communication port that comprises any one of said acceptance ports and the Y types of communication wavelengths, refers to the connection information stored in said storage unit, specifies said particular output port that is connected to each communication unit of said M output ports, specifies the particular forward port that is connected to said communication port of said M forward ports, specifies said particular input port that is connected to said particular forward port of said M input ports, a particular optical path in said switch unit, said particular optical path connecting said particular input port and said particular output port, sets a communication wavelength that the communication unit accepts of said Y types of communication wavelengths for a transmission wavelength of the particular wavelength selection unit connected to the communication unit of said M wavelength selection unit, and controls said switch unit such that the particular optical paths are configured,
  wherein when said switch unit performs a splitting connection in which one particular input port of said M input ports is connected to Y (where Y is equal to or greater than 2 and equal to or smaller than M), said switch unit splits an optical signal that is input to said particular input port into Y split signals and outputs the Y split signals to said Y particular output ports.

15. The optical signal reception device according to claim 14, further comprising:
  a save unit,
  wherein said control unit saves information that represents said communication ports, said communication wavelengths, said communication unit, and the particular optical paths, said particular input ports, said particular output ports, and said particular acceptance ports that are arranged in of said switch unit to said save unit.

16. The optical signal reception device according to claim 14,
  wherein said switch unit is an optical matrix switch in which optical switch elements each have first and second input sections and first and second output sections that are arranged in the same orientation and in a matrix shape of M rows by M columns, the first input section of the optical switch element of M-th row being connected to said input port, the second output section of the optical switch element of M-th column being connected to said output port, and
  wherein when said splitting connection is performed, said optical switch elements each change to either a cross state, a bar state, or a split state in which an optical signal accepted by said first input section is split into two optical signals which are output from said first and second output sections such that the optical signal that is input to said particular input port is split into Y split signals and the Y split signals are respectively output to said Y particular output ports.

17. The optical signal reception device according to claim 14,
wherein said switch unit includes:
a splitting unit that splits an optical signal that is input to said particular input port into said Y split signals when said switch unit performs said splitting connection; and
an output switch unit that outputs said Y split signals that are output from said splitting unit to said Y particular output ports.

18. A wavelength path system, comprising:
a plurality of nodes that multiplex or demultiplex wavelength paths for a plurality of wavelength path multiplexed transmission lines,
wherein said nodes each include:
a wavelength division multiplexing communication device, wherein said wavelength multiplexing communication device includes the optical signal transmission device according to claim 1;
a plurality of optical power splitting units that are respectively connected to said plurality of wavelength path multiplexed transmission lines; and
a plurality of wavelength selection switch units that are respectively connected to said plurality of wavelength path multiplexed transmission lines,
wherein said wavelength paths are configured between an optical output units included in at least one of any two nodes and optical acceptance units included in the other node,
wherein said optical power splitting unit splits a wavelength multiplexed optical signal that is input from a wavelength path multiplexed transmission line connected to its own optical power splitting unit to its own node, outputs one of the split wavelength multiplexed optical signals to a wavelength selection switch unit connected to another wavelength path multiplexed transmission line of said plurality of wavelength selection switch unit, and outputs the other split wavelength multiplexed optical signal to an acceptance port of said wavelength splitting unit of its own node, and
wherein said wavelength selection switch unit accepts a wavelength multiplexed optical signal from said optical power splitting unit and a wavelength multiplexed optical signal from a forward port of said wavelength multiplexing unit included in its own node and outputs any one of the accepted wavelength multiplexed optical signals to a wavelength path multiplexed transmission line connected to its own wavelength selection switch unit.

19. The wavelength path system according to claim 18, wherein said wavelength multiplexing communication device includes an optical signal reception device, said optical signal reception device comprising:
a wavelength demultiplexing unit that has M acceptance ports that accept wavelength multiplexed optical signals and Z (where Z is an integer equal to or greater than N) acceptance ports that are switchably connected to said acceptance ports corresponding to wavelengths of the wavelength multiplexed optical signals that are input to said acceptance ports;
an optical switch unit that has M input ports respectively connected to said M forward ports, M output ports, and a switch unit that switches connections between said input ports and said output ports;
M wavelength selection units that are respectively connected to said M output ports and that are capable of selecting transmission wavelengths; and
M optical acceptance units that are respectively connected to said M wavelength selection units and that receive optical signals that have been transmitted through said wavelength selection units connected to their own wavelength selection units,
wherein when said switch unit performs a splitting connection in which one particular input port of said M input ports is connected to Y (where Y is equal to or greater than 2 and equal to or smaller than M), said switch unit splits an optical signal that is input to said particular input port into Y split signals and outputs the Y split signals to said Y particular output ports.

* * * * *